(12) United States Patent  (10) Patent No.: US 6,745,030 B2
Koyama  (45) Date of Patent: Jun. 1, 2004

(54) MOBILE COMMUNICATION SYSTEM AND MOBILE COMMUNICATION METHOD

(75) Inventor: Junichi Koyama, Tokyo (JP)

(73) Assignee: NEC Corporation, Tokyo (JP)

( * ) Notice: Subject to any disclaimer, the term of this patent is extended or adjusted under 35 U.S.C. 154(b) by 609 days.

(21) Appl. No.: 09/819,601

(22) Filed: Mar. 29, 2001

(65) Prior Publication Data

US 2001/0027101 A1 Oct. 4, 2001

(30) Foreign Application Priority Data

Mar. 31, 2000 (JP) .......................................... 2000-096336

(51) Int. Cl.$^7$ ................................................. H04Q 7/20
(52) U.S. Cl. ...................... 455/433; 455/411; 455/435.1; 455/552.1; 455/555
(58) Field of Search ................................. 455/433, 434, 455/435.1, 435.2, 435.3, 411, 412.1, 412.2, 414.1, 414.2, 403, 554.1, 550.1, 555, 552.1

(56) References Cited

U.S. PATENT DOCUMENTS

| | | | | |
|---|---|---|---|---|
| 5,309,501 A | * | 5/1994 | Kozik et al. | 455/410 |
| 5,530,945 A | * | 6/1996 | Chavez et al. | 455/411 |
| 5,819,178 A | * | 10/1998 | Cropper | 455/433 |
| 5,873,034 A | * | 2/1999 | Alperovich et al. | 455/432.3 |
| 5,915,214 A | * | 6/1999 | Reece et al. | 455/406 |
| 5,924,030 A | * | 7/1999 | Rautiola et al. | 455/426.1 |
| 6,002,931 A | * | 12/1999 | Yamaguchi et al. | 455/433 |
| 6,081,715 A | * | 6/2000 | La Porta et al. | 455/445 |
| 6,546,243 B2 | * | 4/2003 | Tiedemann et al. | 455/419 |

FOREIGN PATENT DOCUMENTS

| | | |
|---|---|---|
| JP | 8-65236 | 3/1996 |
| JP | 8-237727 | 9/1996 |
| JP | 10-4581 | 1/1998 |
| JP | 11-122659 | 4/1999 |
| JP | 2970603 | 8/1999 |
| JP | 11-298930 | 10/1999 |

* cited by examiner

Primary Examiner—CongVan Tran
(74) Attorney, Agent, or Firm—Sughrue Mion, PLLC

(57) ABSTRACT

In a mobile communication system, when a mobile visitor terminal registered at a first network enters a second network, it sends a registration signal to a first exchange belonging to the second network. The first exchange sends a roaming start request signal to the first network. On receiving authentication information from the first network, the exchange writes it in a VLR (Visitor Location Register) storage. On the origination of a call on the visitor terminal, call information is written to a call information storage. A third exchange stores in an VLR holding node number storage the fact that the call information is stored in the first exchange. When the visitor terminal moves to the area of a second exchange, the second exchange sees, based on the content of the VLR holding node number storage, that the authentication information is stored in the first exchange, and obtains it. The second exchange switches connection thereto on the basis of the authentication information and call information.

23 Claims, 16 Drawing Sheets

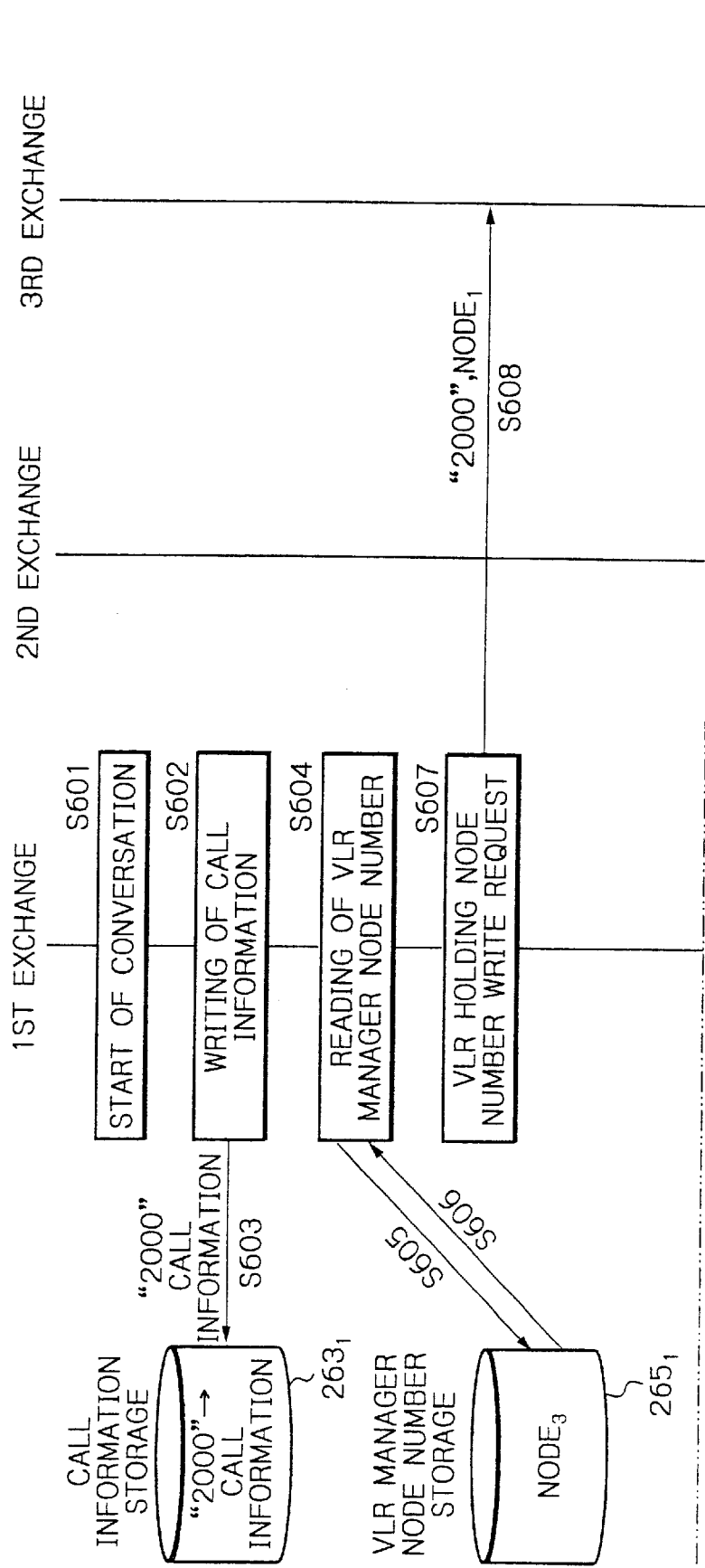

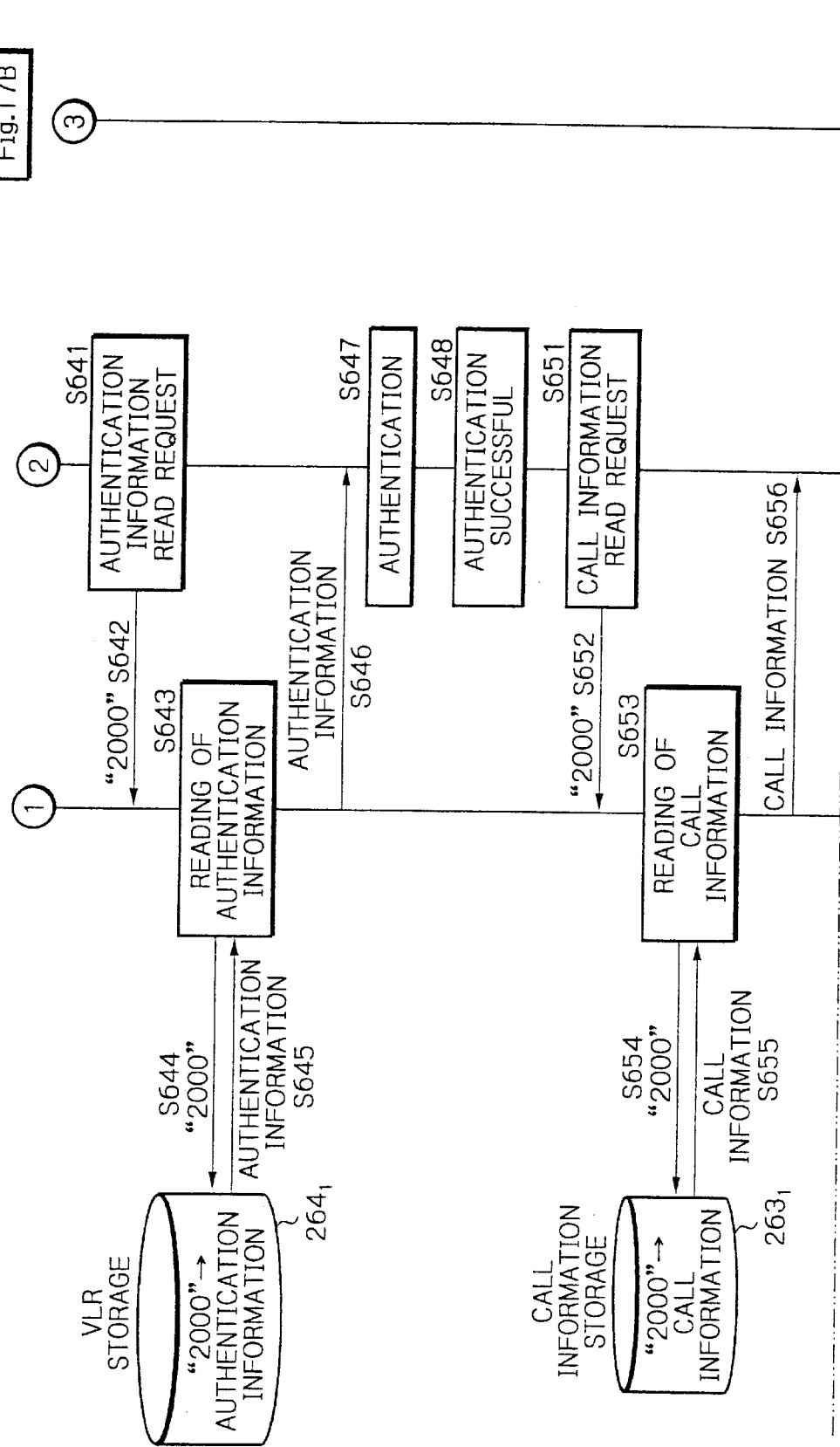

MOBILE COMMUNICATION SYSTEM AND MOBILE COMMUNICATION METHOD

BACKGROUND OF THE INVENTION

The present invention relates to a mobile communication system and more particularly to a mobile communication system allowing communication to be held on a portable telephone or similar mobile terminal moved from one network to another network, and a mobile communication method.

The spread of PHS (Personal Handy-Phone system) and other portable telephone systems has derived a convenient mobile communication environment. A portable telephone is usable anywhere in an office as an extension telephone and allows a person carrying it to be located on the basis of a location display function available therewith. Further, a person carrying a portable telephone can use it for a private purpose outside of an office via a general telephone channel.

In a relatively small office, all the portable telephones registered at a network constructed in the office can be dealt with by a single exchange. However, in a relatively large office or a company or organization having a plurality of offices distributed in, e.g., an urban area, it is impossible for a single exchange to manage all the portable telephones in the geographical or capacity aspect. In light of this, there has been proposed a system in which a plurality of exchanges are distributed in a preselected area, and each manages particular portable telephones. In this system, when a person carrying a portable telephone moves from, e.g., one building to another building owned by the same company or organization, the above proposed system manages the telephone as if the telephone were connected to a single exchange. Such control over communication is achievable because a plurality of exchanges constitute an apparent, single exchange system.

In practices however, the possibility that a mobile telephone is moved between different networks must be taken into account. For example, if a mobile telephone moved from a first network to a second network is dealt with as a visitor terminal, a call can be originated on the mobile telephone. However, when a call is originated on the mobile telephone registered at the first network, but moved to the second network, hand-over is cannot be executed if the telephone in communication enters another area of the second network.

Japanese Patent Laid-Open Publication No. 8-65236 discloses a system that implements radio mobile communication without regard to the position of a mobile telephone as well as hand-over between a plurality of telephone-based radio networks. The system, however, pertains to radio mobile communication using exchanges that are connected to the same network. That is, the system does not work when a mobile telephone or visitor terminal moved from a first network to a second network further moves between exchanges connected to the second network.

Technologies relating to the present invention are also disclosed in Japanese Patent Laid-open Publication Nos. 8-237727, 10-4581, 11-122659 and 11-298930 and Japanese Patent NO. 2,970,603.

SUMMARY OF THE INVENTION

It is an object of the present invention to provide a mobile communication system and a mobile communication method capable of implementing, when a mobile terminal registered at a first network enters a second network including a plurality of exchanges and starts communication, hand-over between the exchanges of the second network even if the mobile terminal in communication moves in the second network.

In accordance with the present invention, a mobile communication system includes a network identification information obtaining circuit belonging to a first network for obtaining, when a mobile terminal not registered at the first network enters the first network as a visitor terminal, identification information that identifies a second network at which the mobile terminal is registered. An authentication information requesting circuit requests, based on the identification information obtained, the second network to send authentication information necessary for the visitor terminal to communicate in the first network. When the authentication information is received from the second network, an authentication information storage stores the authentication information in any one of a plurality of exchanges belonging to the first network. A call information storage stores call information generated when the visitor terminal starts communication in the first network. An exchange storage stores information representative of the exchanges each storing the authentication information and call information of a particular visitor terminal. When any one of the exchanges needs for hand-over the authentication information and call information of the visitor terminal that moves while in communication, a searching circuit searches the contents of the exchange storage to thereby locate the exchange storing the authentication information and call information and provides the above one exchange with the authentication information and call information.

A mobile communication method for executing above procedure is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, reference will be made to a conventional mobile communication system generally referred to as a one-system look, shown in FIG. 1. A one-system look refers to a system including a plurality of exchanges that constitute an apparent, single exchange system, and implements the same operability with the same service.

Figure 1:
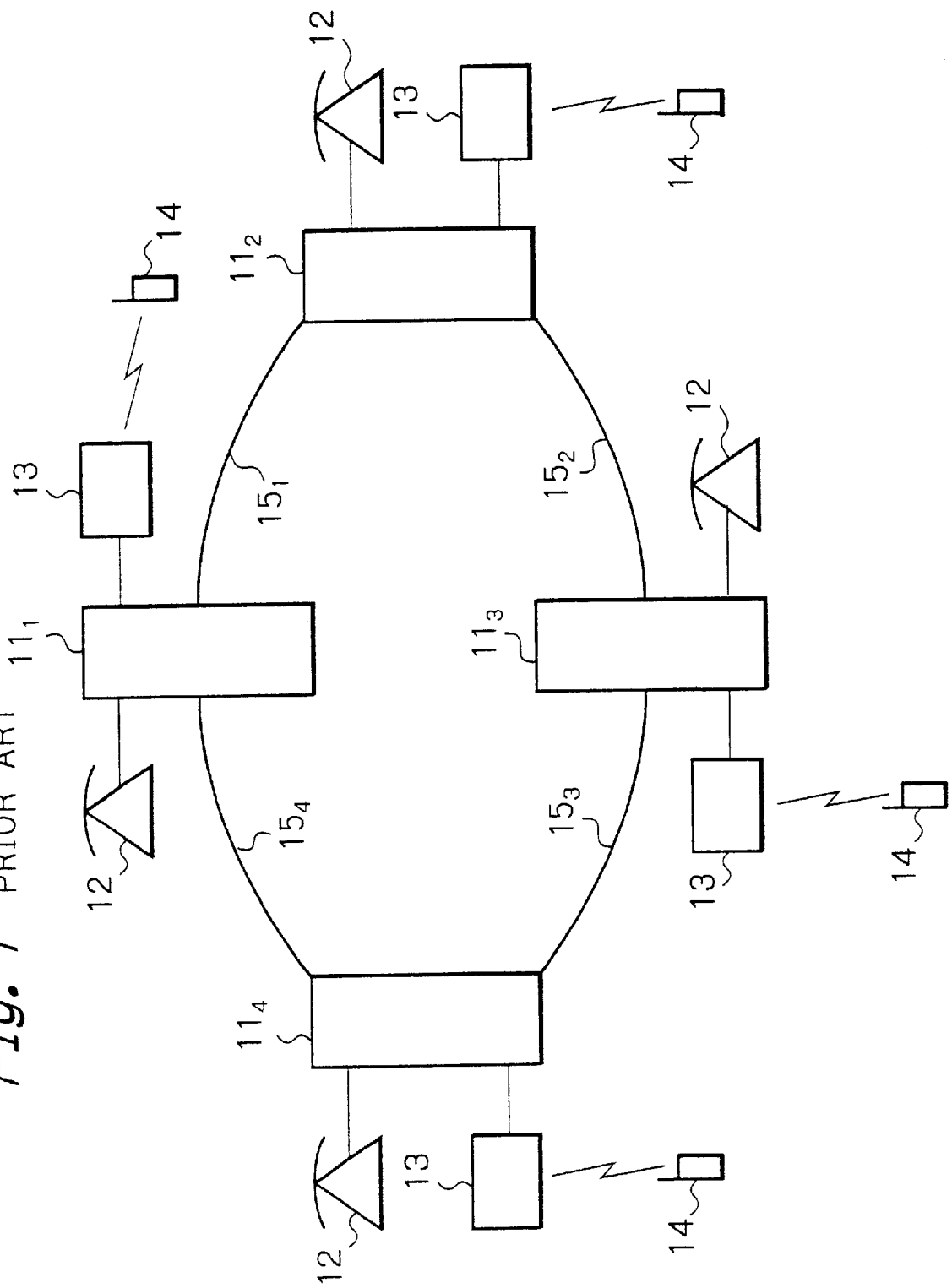
FIG. 1 is a schematic block diagram showing a system including four exchanges, which constitute an apparent, single exchange system, and generally referred to as a one-system look.

As shown in FIG. 1, the system includes a first to a fourth exchange $11_1$ through $11_4$ each accommodating a fixed extension telephone 12 and a mobile telephone 14 communicable via a connecting device 13. The exchanges $11_1$ through $11_4$ connected together by trunks $15_1$ through $15_4$ in, e.g., a loop.

While each extension telephone 12 is fixedly connected to associated one of the exchanges $11_1$ through $11_4$ by wire, each mobile telephone 14 is freely movable in a company or similar organization. To allow the exchanges $11_1$ through $11_4$ to work as an apparent, single exchange, two different functions are essential, i.e., a network roaming function and a network hand-over function. The network roaming function allows the mobile telephone 14 used as the extension of one exchange 11 to originate or receive a call with the same extension number even when moved to an area covered by another exchange 11. The network hand-over function allows the mobile telephone to be moved from an area assigned to one exchange to another area assigned to another exchange without communication being interrupted.

Figure 2:
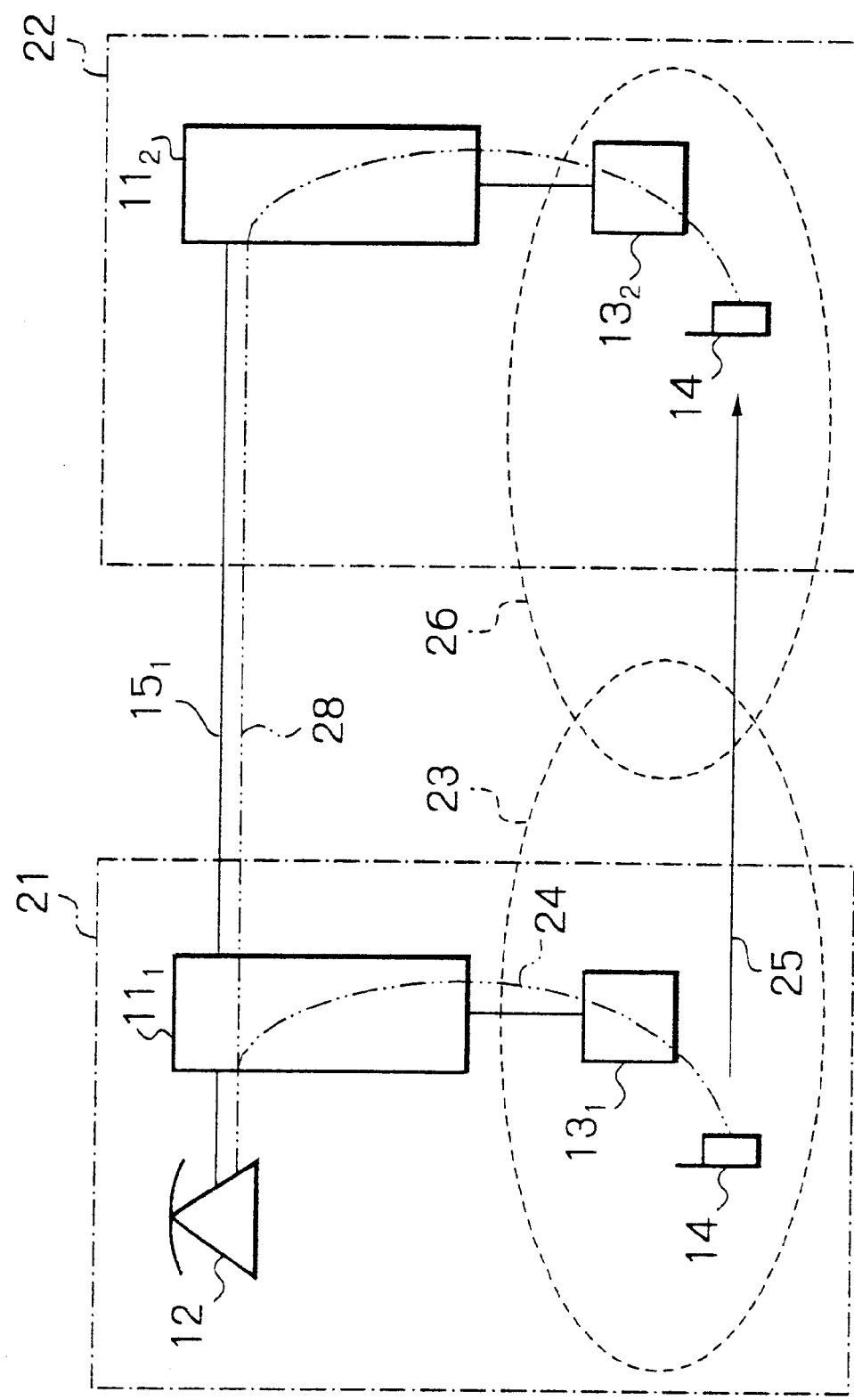
FIG. 2 is a schematic block diagram demonstrating a specific hand-over function between a main building and an annex belong to the same company or organization.

The network hand-over function will be described with reference to FIG. 2. Assume that the first exchange $11_1$ is installed in a main building 21 belonging to a certain company, and that the second exchange $11_2$ is installed in an annex 22 next to the main building 21. Also, assume that communication is held between the extension telephone 12 and mobile telephone 14, which is another extension telephone, in the main building 21, and that the mobile telephone 14 moves from the main building to the annex 22 while in communication. Then, so long as the mobile telephone 14 is positioned in the main building 21, it lies in an area 23 covered by the connecting device $13_1$ and can communicate with the extension telephone 12. The communication path between the extension telephone 12 and the mobile telephone 14 is indicated by a dash-and-dots line 24.

When the mobile telephone 14 in communication is moved in a direction indicated by an arrow 25, it leaves the area 23 and then enters an area 26 assigned to the second exchange $13_2$ installed in the annex 22. At this instant, the first exchange $13_1$ switches the connection path from the path 24 to the trunk $15_1$ and thereby sets up a path including the second exchange $11_2$ and connecting device $13_2$ associated therewith. This allows the communication to be continued on the mobile telephone 14 without interruption. The new connection path between the extension telephone 12 and the mobile telephone 14 is indicated by a dash-and-dots line 28.

The above-described control over communication is achievable because a plurality of exchanges constitute an apparent, single exchange system. In practice, however, the possibility that the mobile telephone 14 is moved between different networks must be taken into account.

Figure 3:
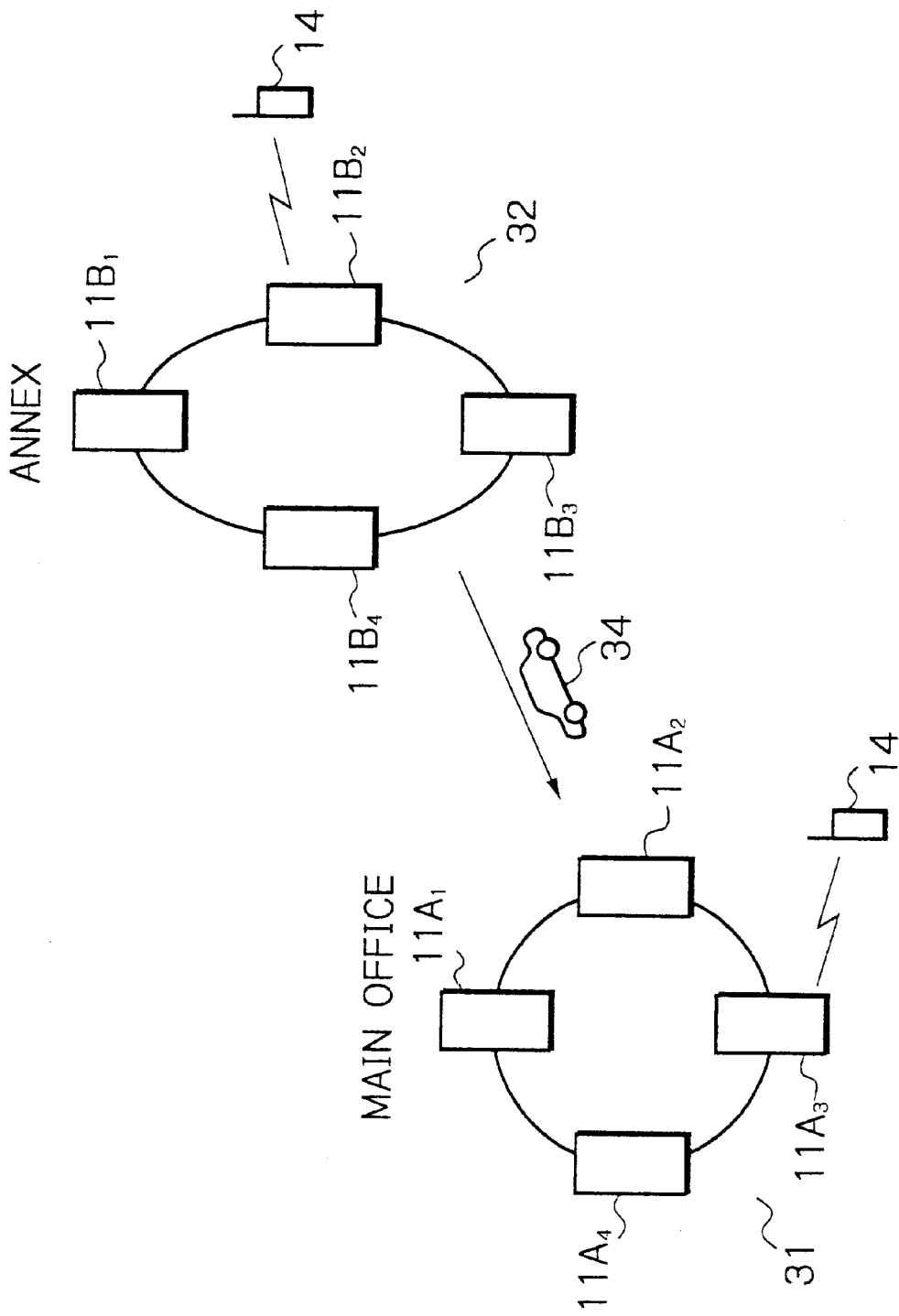
FIG. 3 is a schematic block diagram showing a plurality of networks belonging to the same company or organization.

FIG. 3 shows a specific system in which a single company or organization has a plurality of networks. As shown, assume that a certain company has a main office located in a region A and having a first network 31 and a branch located in a region B and having a second network 32. Then, the main office and branch each have a particular exchange specification, so that the two networks 31 and 32 cannot be provided with the same configuration. The networks 31 and 32, like the network of FIG. 1, respectively accommodate a plurality of exchanges $11A_1$ through $11A_4$ and a plurality of exchanges $11B_1$ through $11B_4$. Each mobile telephone or extension telephone 14 is usable within a particular network.

Assume that a person at the branch goes to the main office by, e.g., a car 34 while carrying the mobile telephone 14. Then, the problem is that whether or not the person can use the mobile telephone 14 accommodated in the second network 32 in the first network 31. More specifically, a first problem is that whether or not communication can be held on the mobile station 14 moved to another network. A second problem is that when the mobile station 14 is moved within the network 31 with communication being held thereon, whether or not hand-over can be effected in the same manner as in FIG. 2.

Figure 4:
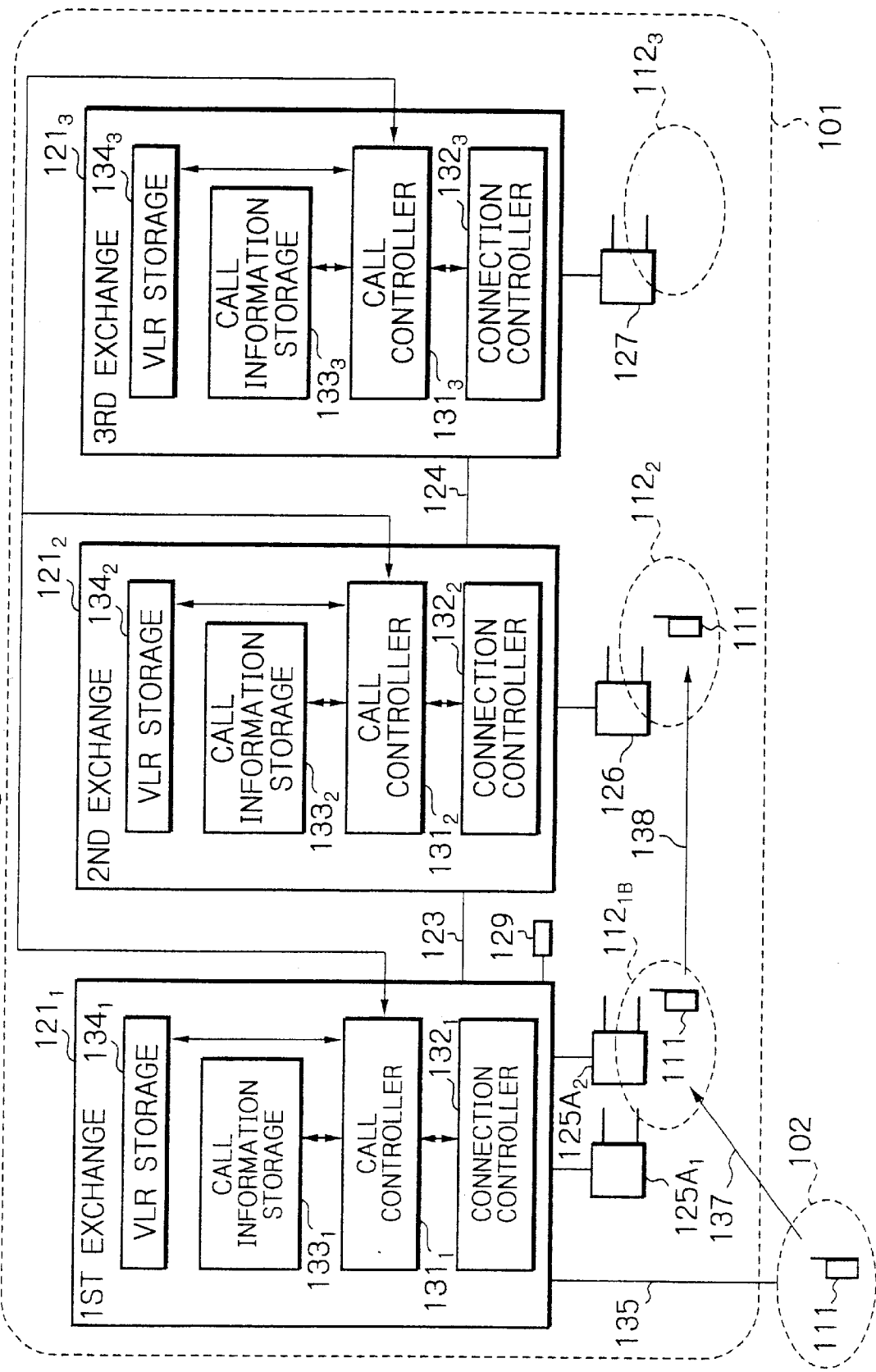
FIG. 4 is a schematic block diagram showing another conventional mobile communication system.

FIG. 4 shows another conventional mobile communication system. As shown, the system includes a first network 101 and a second network 102 adjoining the first network 101. The first and second networks 101 and 102 each are similar to the networks shown in FIGS. 1–3. A particular mobile terminal 111 is registered at the second network 102 similar to the second network 32 of FIG. 3, but not registered at the first network 101. In the following description, the mobile terminal 111 entered the first network 101 is assumed to move from a first area $112_{1B}$ to a second area $112_2$ with conversation being held thereon.

The first network 101 accommodates a first to a third exchange $121_1$ through $121_3$. A trunk 123 connects the first and second exchanges $121_1$ and $121_2$ in order to allow them to interchange data. Likewise, a trunk 124 connects the second and third exchanges $121_2$ and $121_3$ in order to allow them to interchange data. The exchanges $121_1$ through $121_3$ accommodate radio base stations 125 through 127, respectively, and each communicates with a mobile terminal lying in associated one of areas $112_1$ through $112_3$.

The first exchange $121_1$ includes a call controller $131_1$ for controlling a call. A connection controller $132_1$ controls connection with a mobile terminal. A call information storage $133_1$ stores call information while a VLR storage $134_1$ stores authentication information and call information relating to a visitor mobile terminal moved from a foreign network. Likewise, the second and third exchanges $121_2$ and $121_3$ respectively include call controllers $131_2$ and $131_3$, connection controllers $132_2$ and $132_3$, call information storages $133_2$ and $133_3$, and VLR storages $134_2$ and $134_3$. As for the authentication information, when the mobile station originates a call, receives a call, registers its location or is handed over, the exchanges $121_1$ through $121_3$ each reference the information to see if the mobile station is qualified in the respective area.

The call controllers $131_1$ through $131_3$ each write and read data out of the respective storages to thereby execute call processing. Further, each call controller 131 feeds a connection request to the associated connection controller 132 when starting call connection, and interchanges call control data with the other call controllers 131.

The first exchange $121_1$, for example, accommodates a plurality of radio base stations $125A_1$, $125A_2$ and so forth each covering a particular area. In the following description, assume that the mobile station 111 moves from the second network 102 to the first network 101, as indicated by an arrow 137. Also, assume that when the mobile station lies in an area $112_{1B}$ covered by the radio base station $125A_1$, a call meant for an extension telephone 129 is originated on the mobile terminal 111.

When the mobile terminal 111 enters the area $112_{1B}$, the first exchange $121_1$ receives a registration signal from the mobile station 111 via the base station $125A_2$. The registration signal includes a number identifying the second network 102 at which the mobile station 111 is registered. By comparing the above number with a number stored in the exchange $121_1$ the exchange $121_1$ determines that the mobile terminal 111 is not a subscriber belonging thereto. The exchange $121_1$ then selects a trunk 135 connecting it and the second network 102 and sends a roaming start request signal to the network 102. Although the two networks 101 and 102 may be geographically remote from each other, they belong to the same company or organization. Therefore, the exchange $121_1$ can identity, based on the number included in the above registration signal, the network 102 at which the mobile station 111 is registered, and then select the trunk 135.

On receiving the roaming start request signal, the second network 102 generates authentication information necessary for the mobile terminal 111 to communicate in the network 101. The network 102 sends the authentication information to the exchange $121_1$. In response, the exchange $121_1$ writes the authentication information in the VLR storage $134_1$. Even when the mobile terminal 111 moves to any other radio base station belonging to the exchange $121_1$ later, e.g., the base station $125A_1$, the exchange $121_1$ can read the authentication information and call information out of the VLR storage $134_1$ and call information storage $133_1$, respectively. This realizes hand-over for preventing conversation under way from being interrupted.

As stated above, if the mobile terminal 111 moved from the second network 102 to the first network 101 is dealt with as a visitor terminal, a call can be originated on the mobile terminal 111. However, when a call is originated on the mobile terminal 111 registered at the network 102, but moved to the network 101, hand-over cannot be executed if the mobile terminal 111 in communication enters another area of the network 101. This will be described hereinafter on the assumption that the mobile terminal 111 entered the first network 101 moves from the area $112_{1B}$ covered by the first exchange $121_1$ to an area $112_2$ covered by the second exchange $121_2$.

In the specific case described above, only the first exchange $121_1$ stores the authentication information relating to the mobile terminal 111 in its VLR storage $134_1$. That is, the second exchange $121_2$ to which the mobile terminal 111 is handed over does not store the above information in its VLR storage $134_2$. Also, the second exchange $121_2$ does not store the call information of the mobile terminal 111 in its call information storage $133_2$. It follows that conversation being held on the mobile terminal 111 is interrupted as soon as the mobile terminal 111 moves from the area $112_{1B}$ to the area $112_2$.

Figure 5:
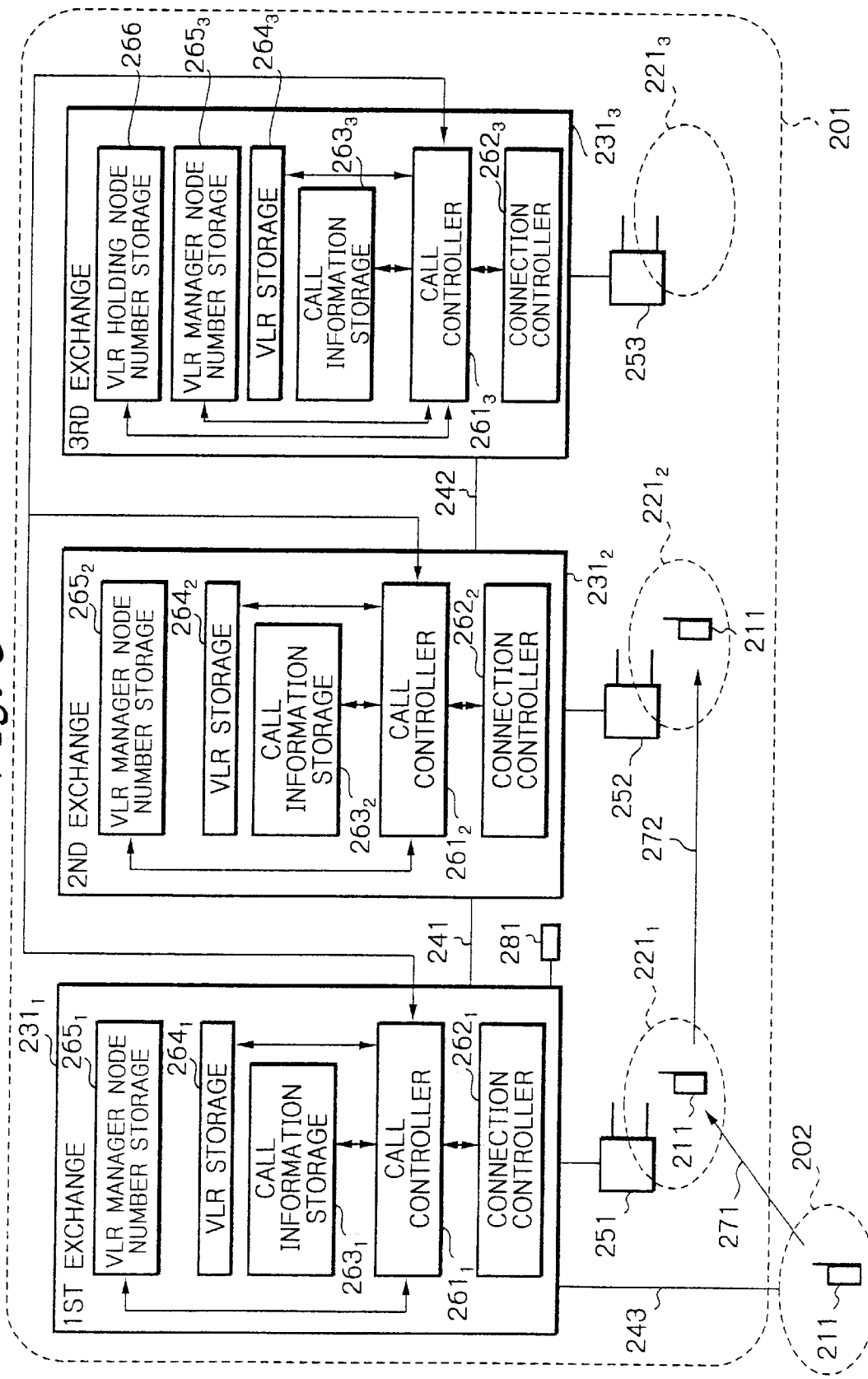
FIG. 5 is a schematic block diagram showing a mobile communication system embodying the present invention.

Referring to FIG. 5, a mobile communication system embodying the present invention is shown. As shown, the system is assumed to include a first network 201, on which the following description will concentrate, and a second network 202 adjoining the first network 201. The networks 201 and 202 each are constructed at, e.g., a main office or a branch in the same manner as in FIG. 3. A particular mobile terminal 211 is registered at the second network 202. In the following description, assume that the mobile terminal or visitor terminal 211 moves from the second network 202 to the first network 201, and that conversation is held on the mobile terminal 211 while the terminal 211 moves from a first area $221_1$ to a second area $221_2$.

The first network 201 is a one-system look in which a first to a third exchange $231_1$ through $231_3$ function apparently as a single exchange. A trunk 241 connects the first and second exchanges $231_1$ and $231_2$ so as to allow them to interchange data. Likewise, a trunk 242 connects the second and third exchanges $231_2$ and $231_3$ so as to allow them to interchange data. The first to third exchanges $231_1$ through $231_3$ accommodate radio base stations 251 through 253, respectively, and each is capable of communicating with a mobile terminal lying in associated one of the areas $221_1$ through $221_3$.

The first exchange $231_1$ includes a call controller $261_1$ for controlling a call. A connection controller $262_1$ controls connection between the exchange and the mobile terminal 211. A call information storage $263_1$ stores call information. A VLR storage $264_1$ stores authentication information. A VLR manager node number storage $265_1$ stores a VLR manager node number. Likewise, the second and third exchanges $231_2$ and $231_3$ respectively include call controllers $261_2$ and $261_3$, connection controllers $262_2$ and $262_3$, call information storages $263_2$ and $263_3$, VLR storages $264_2$ and $264_3$, and VLR manager node number storages $265_2$ and $265_3$. The third exchange $231_3$ additionally includes a VLR holding node number storage 266 for storing a number assigned to a node that holds VLR. In the following description, the exchange $231_3$ including the unique storage 266 will be referred to as a VLR manager node. It is to be noted that node numbers refer to unique numbers each being assigned to particular one of the three exchanges $231_1$ through $231_3$.

The call controllers $261_1$ through $261_3$ each write and read information out of the respective storages to thereby execute call processing. Further, each call controller 261 feeds a connection request to the associated connection controller 262 when starting call connection, and interchanges call control data with the other call controllers 261.

The VLR holding node number storage 266 particular to the third exchange $231_3$ stores a node number assigned to one of the exchanges $231_1$ through $231_3$ that stores the VLR of the mobile terminal 211. To store the node number, the exchange $231_3$ uses a terminal number assigned to the mobile terminal 211 as a key. Specifically, when the mobile terminal 211 enters the network at which it is not registered, and starts communication, the exchange $231_3$ writes the node number of the exchange dealing with the communication in its VLR holding node number storage 266. When the communication on the mobile terminal 211 ends, the exchange $231_3$ deletes the node number stored in the storage 266.

In the illustrative embodiment, the VLR holding node number storage 266 exists only in the third exchange $231_3$. The node number of the third exchange $231_3$ is therefore written to the VLR node number storages $265_1$ through $265_3$ as a VLR manager node number. It follows that the exchanges $231_1$ through $231_3$ each can read the VLR manager node number out of the respective call controller 261 and recognize the exchange $231_3$ that stores the VLR holding node number.

Basically, the exchanges $231_1$ through $231_3$ included in the network 201 each are implemented as an ordinary computer and peripheral units connected thereto, although not shown specifically. Mores specifically, each exchange 231 includes a CPU (Central Processing Unit), a magnetic disk or similar storing medium storing a program for controlling the exchange 231, and a RAM (Random Access Memory) used to store the program read out of the storing medium and to temporarily store various data for executing the program. Part of the RAM may constitute a nonvolatile memory backed up by, e.g., a battery. The call information storage 263 and other storages may be implemented by the RAM, if desired.

How the illustrative embodiment executes control when the mobile terminal 211 registered at the second network 202 moves to the first network 201, as indicated by an arrow 271 in FIG. 5, will be described hereinafter. Assume that the mobile terminal 211 arrives at the area $221_1$ covered by the radio base station 251. Then, the mobile terminal 211 sends a registration signal to the first exchange $231_1$ via the base station 251. The registration signal includes a number for identifying a home station at which the mobile station 211 is registered, e.g., the second network 202. By examining the number included in the registration signal, the exchange $231_1$ determines that the mobile terminal 211 is registered at the second network 202. The exchange $231_1$ then sends a roaming start request signal to the network 202 via a trunk 243 extending between the exchange $231_1$ and the network 202, so that the change $231_1$ can communicate with the network 202.

On receiving the roaming start request signal, the network 202 sends authentication information necessary for the mobile terminal 211 to hold communication in the network 201 to the exchange $231_1$. The exchange $231_1$ writes the received authentication information in its VLR storage $246_1$. In this condition, assume that a call meant for an extension telephone 281, which is connected to the exchange $231_1$, is originated on the mobile terminal 211.

Figure 6:
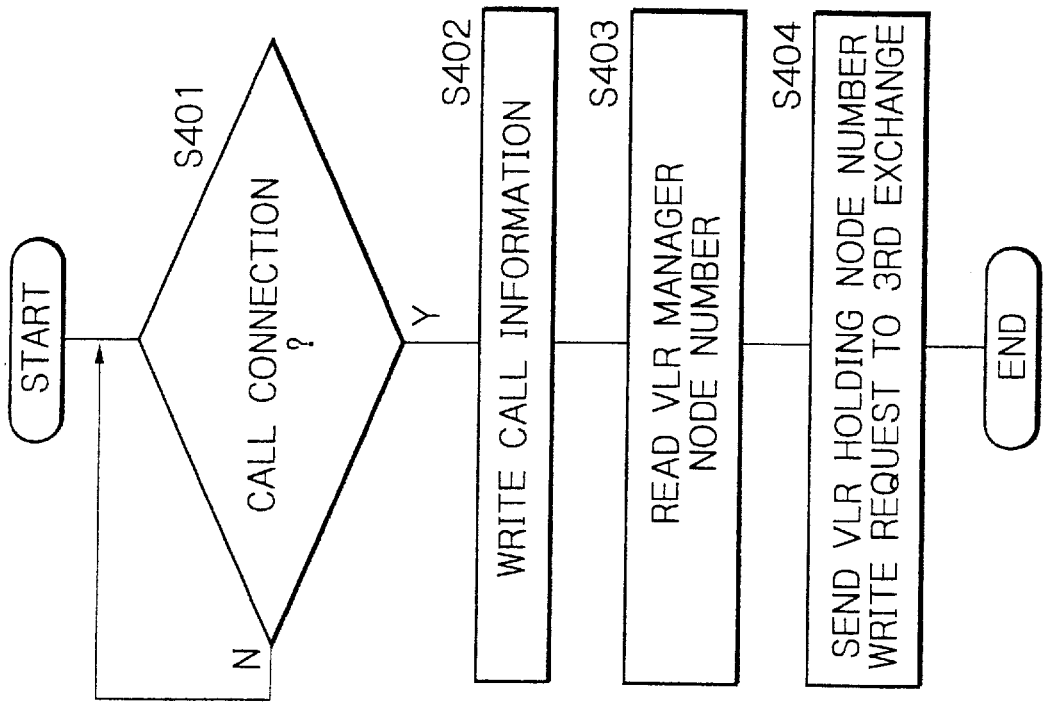
FIG. 6 is a flowchart showing a control procedure to be executed by a first exchange included in the illustrative embodiment when a visitor terminal starts communicating with an extension telephone.

FIG. 6 shows a call control procedure to be executed by the exchange $231_1$. As shown, assume that a call is connected between the mobile terminal 211 and the extension telephone 281 (Y, step S401). Then, the call controller $261_1$ of the exchange $231_1$ writes the location of the base station 251 to which the mobile terminal 211 is connected and the location of the extension telephone 281 in the call information storage $263_1$ as call information (step S402).

Subsequently, the call controller $261_1$ reads a VLR manager node number out of the VRL manager node number storage $265_1$ (step S403). In the illustrative embodiment, the VRL manager node number refers to the node number assigned to the third exchange $231_3$, which includes the VLR holding node number storage 266, as stated previously. Such a node number is written to the VLR manager node number storages $265_1$ via a maintenance terminal or similar inputting means, not shown, when the network is constructed or modified. On identifying the third exchange $231_3$, the call controller $261_1$ generates a VLR holding node number write request, which includes the terminal number of the mobile terminal 221 and the node number assigned to the exchange $231_1$. The call controller $261_1$ sends this request to the exchange $231_3$ (step S404).

Figure 7:
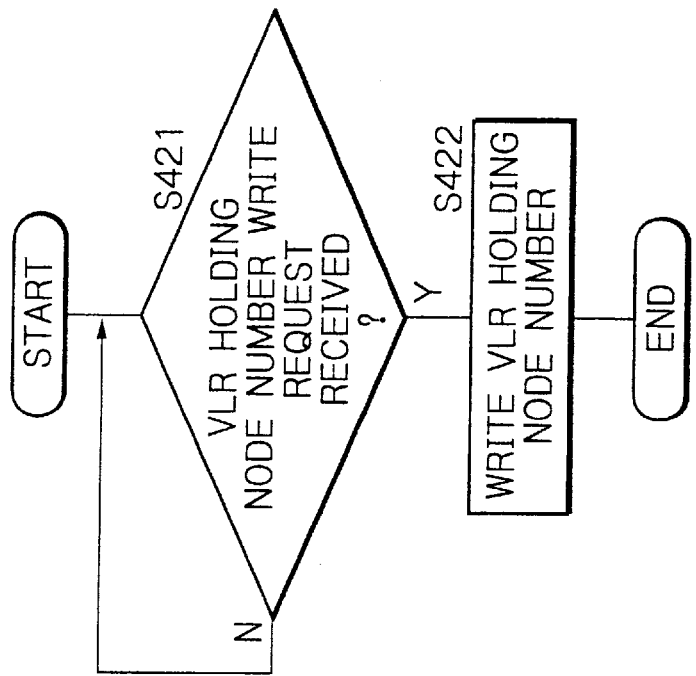
FIG. 7 is a flowchart showing a control procedure to be executed by a third exchange included in the illustrative embodiment in response to a VLR (Visitor Location Register) holding node number write request.

As shown in FIG. 7, on receiving the VLR holding node number write request (Y, step S421), the exchange $231_3$ writes the VLR holding node number in the VLR holding node number storage 266 (step S422). More specifically, by using the terminal number of the mobile terminal 211 as a key, the exchange $231_3$ writes the node number received from the exchange $231_1$ in the VLR holding node number storage 266. Likewise, when a call is originated on the mobile terminal 211 in an area covered by the second exchange $231_2$, the exchange $231_3$ will write a node number received from the exchange $231_2$ in the VLR holding node number storage 266.

Assume that the mobile terminal 211 lies in the area $221_1$ even after the above control executed by the first and third exchanges $231_1$ and $231_3$. Then, the communication between the mobile terminal 211 and the extension telephone 281 continues.

Assume that the mobile terminal 211 moves from the area $221_1$ to the area $221_2$ while communicating with the extension telephone 281. Then, the second exchange $231_2$ executes control shown in FIG. 8 As shown, when the mobile terminal 211 enters the area $221_2$, the second exchange $231_2$ receives the terminal number of the mobile terminal 211 (Y, step S441). In response, the call controller $261_2$ of the exchange $231_2$ determines whether or not the received terminal number is registered at the network 201 (step S442). If the answer of the step S442 is Y, meaning that the terminal number is not a visitor number, then the call controller $261_2$ executes conventional processing (step S443), which will not be described specifically. If the answer of the step S442 is N, meaning that the terminal number is a visitor number, then the call controller $261_2$ searches the VLR storage $264_2$ by using the terminal number as a key (step S444). In this case, because the mobile terminal 211 has arrived at the area $221_2$ from another area, the terminal number of the mobile terminal 211 is absent in the VLR storage $264_2$ (N, step S445). The call controller $261_2$ therefore reads the VLR manager node number out of the VLR manager node number storage $265_2$ (step S446), and sees that the third exchange $231_3$ is the VLR manager node storing the VLR holding node number (step S447). The call controller $261_2$ then sends a VLR holding node number read request to the third exchange or VLR manager node $231_3$ (step S448).

On the other hand, if the terminal number of the mobile terminal exists in the VLR storage $264_2$ (Y, step S445), then the call controller $261_2$ determines that the mobile terminal 211 has moved between the base stations 252 belonging to the same exchange $231_2$. In this case, the call controller $261_2$ determines that the mobile terminal 211 has moved within the coverage of the exchange $231_2$ and handles the movement as hand-over within the exchange. (step S449).

Figure 9:
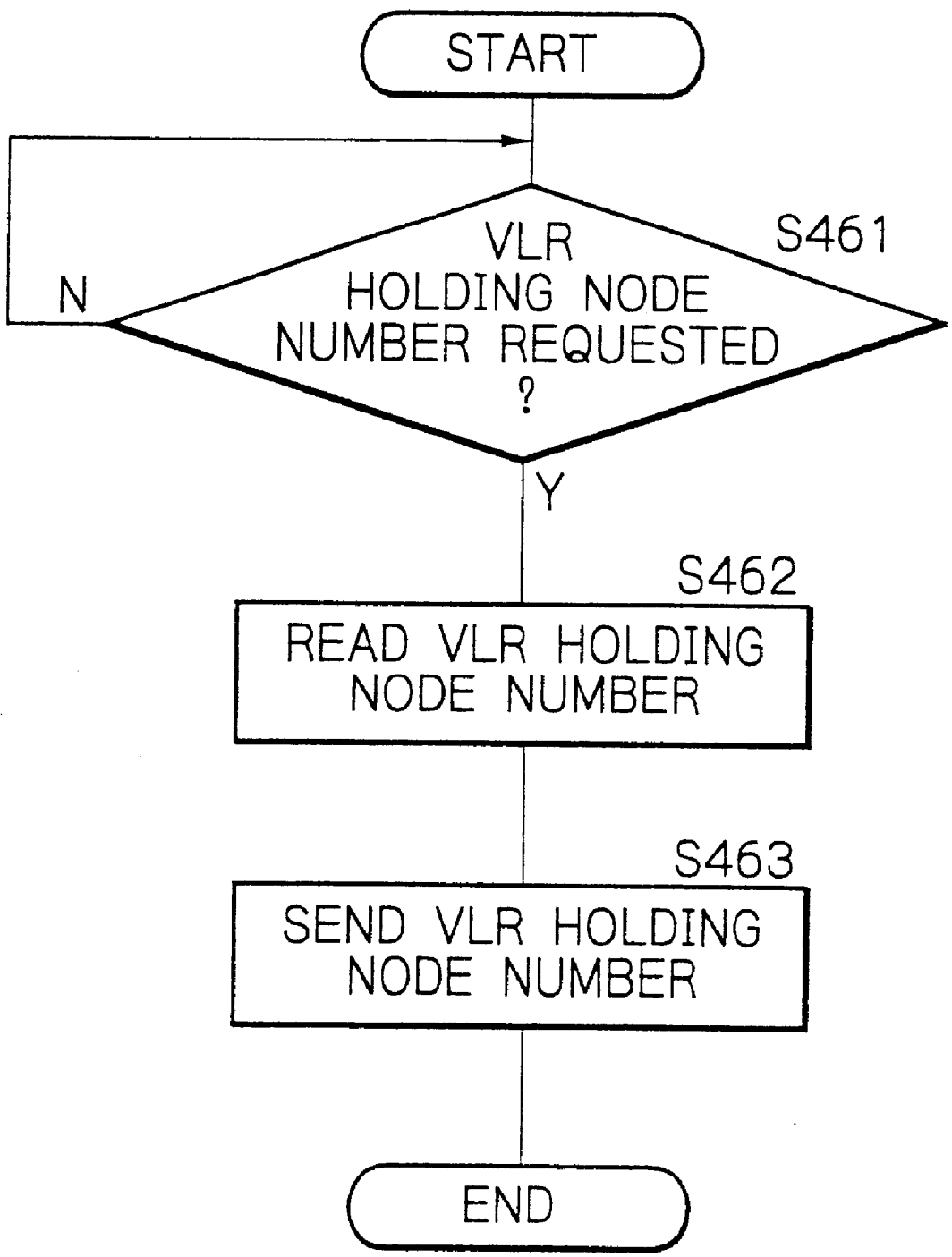
FIG. 9 is a flowchart showing a control procedure to be executed by the third exchange in response to a VLR holding node number read request.

As shown in FIG. 9, on receiving the VLR holding node number read request (Y, step S461), the third exchange $231_3$ reads the VLR holding node number out of its VLR holding node number storage 266 (step S462). The exchange $231_3$ then sends the VLR holding node number to the second exchange $231_2$ (step S463).

Figure 10:
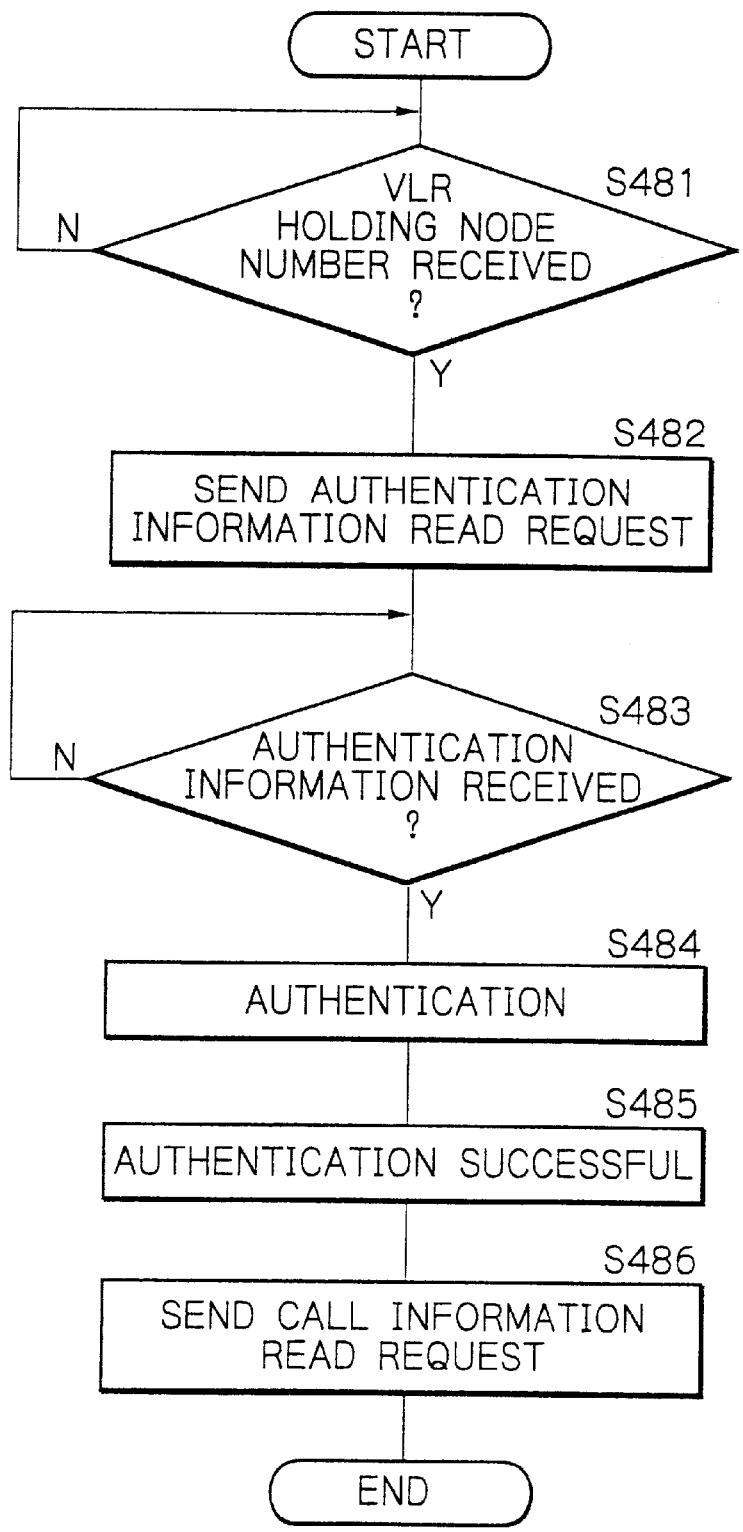
FIG. 10 is a flowchart showing a control procedure to be executed by the second exchange on the receipt of a VLR holding node number.

As shown in FIG. 10, on receiving the VLR holding node number (Y, step S481), the call controller $261_2$ of the second exchange $231_2$ requests the call controller $261_1$ of the first exchange $231_1$, which is indicated by the received node number, to send the authentication information of the mobile terminal 211 (step S482). The call controller $261_2$ then waits until it receives the authentication information from the first exchange $231_1$ (step S483).

Figure 11:
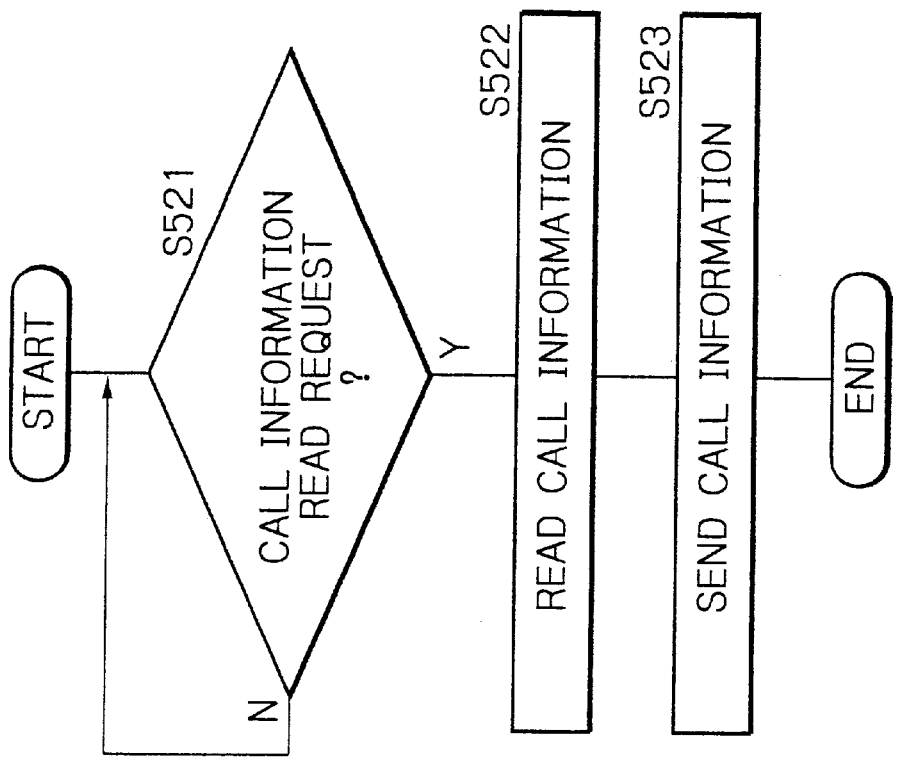
FIG. 11 is a flowchart showing a control procedure to be executed by a call controller included in the first exchange in response to an authentication information read request.

As shown in FIG. 11, on receiving the request for the authentication information from the second exchange $231_2$ (Y, step S501), the call controller $261_1$ of the first exchange $231_1$ reads the authentication information out of the VLR storage $264_1$. The call controller $261_1$ then sends the authentication information to the second exchange $231_2$ (step S502).

Referring again to FIG. 10, on receiving the authentication information from the first exchange $231_1$ (Y, step S483), the call controller $261_2$ of the second exchange $231_2$ determines whether or not the mobile terminal 211 is authenticatable (step S484). It the mobile terminal is authenticatable (step S485), then the call controller $261_2$ sends a call information read request to the first exchange $231_1$ in order to obtain the location of the base station 251 to which the mobile terminal 211 has been connected and the location of the extension telephone 201 (step S486).

Figure 12:
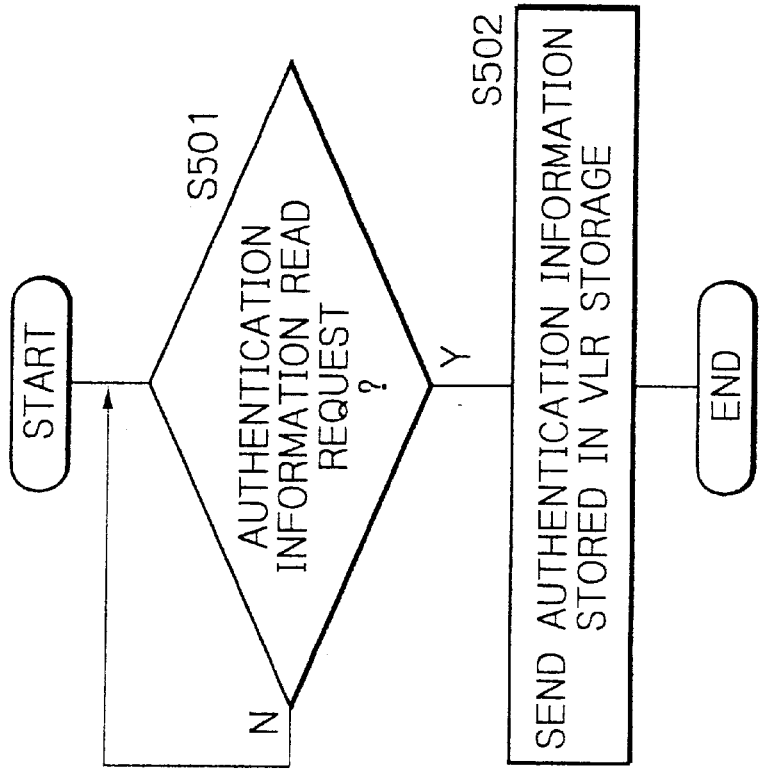
FIG. 12 is a flowchart showing a control procedure to be executed by the first exchange on the receipt of a call information read request.

As shown in FIG. 12, on receiving the call information read request from the second exchange $231_2$ (Y, step S521$_2$), the call controller $261_1$ of the first exchange $231_1$ reads part of the call information representative of the location of the base station and that of the extension telephone 281 out of the call information storage $263_1$ (step S522) and sends it to the second exchange $231_2$ (step S523).

Figure 13:
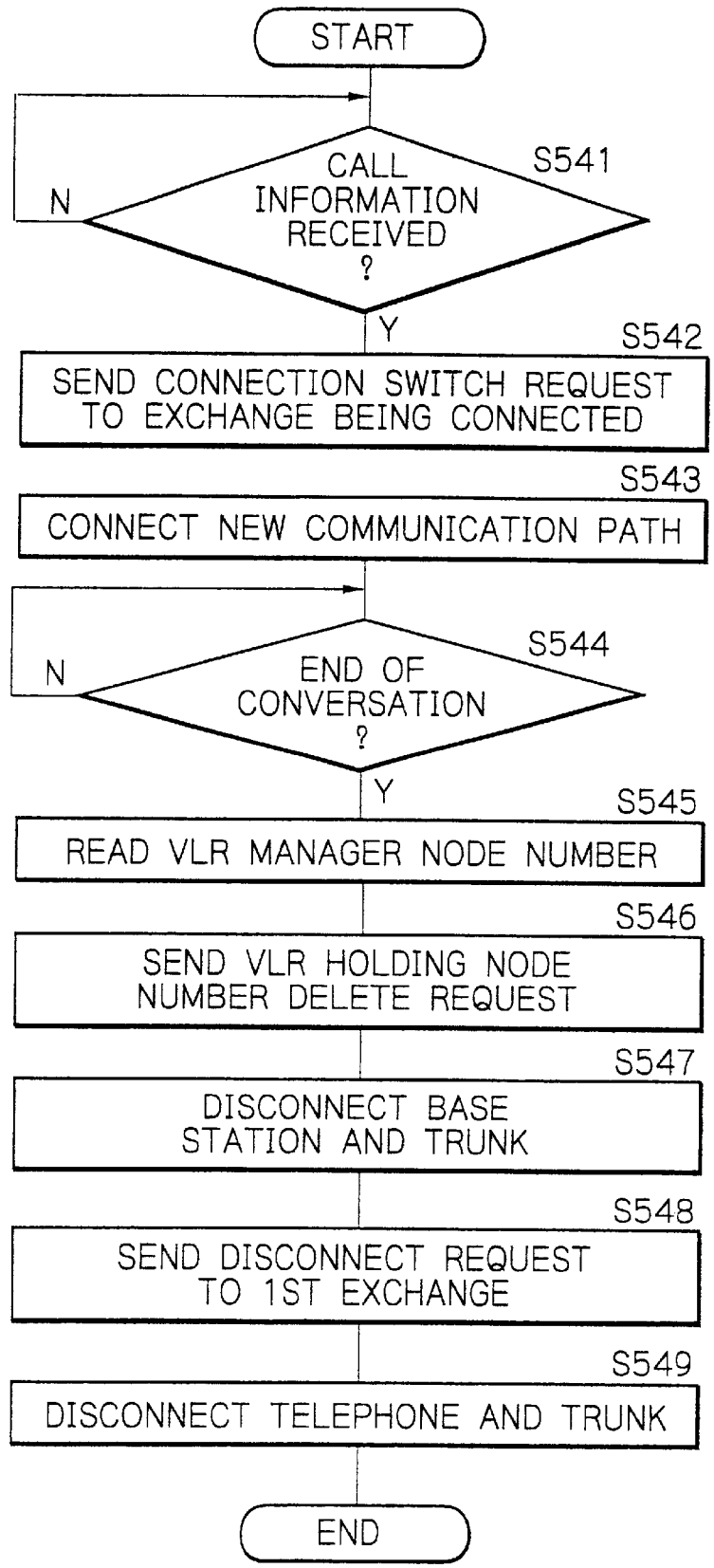
FIG. 13 is a flowchart showing a control procedure to be executed by the second exchange on the receipt of call information.

As shown in FIG. 13, on receiving the call information from the first exchange $231_1$ (Y, step S541), the call controller $261_2$ or the second exchange $231_2$ sends a connection switch request for switching the exchange to the call controller $261_1$ of the first exchange $231_1$ (step S542).

Figure 14:
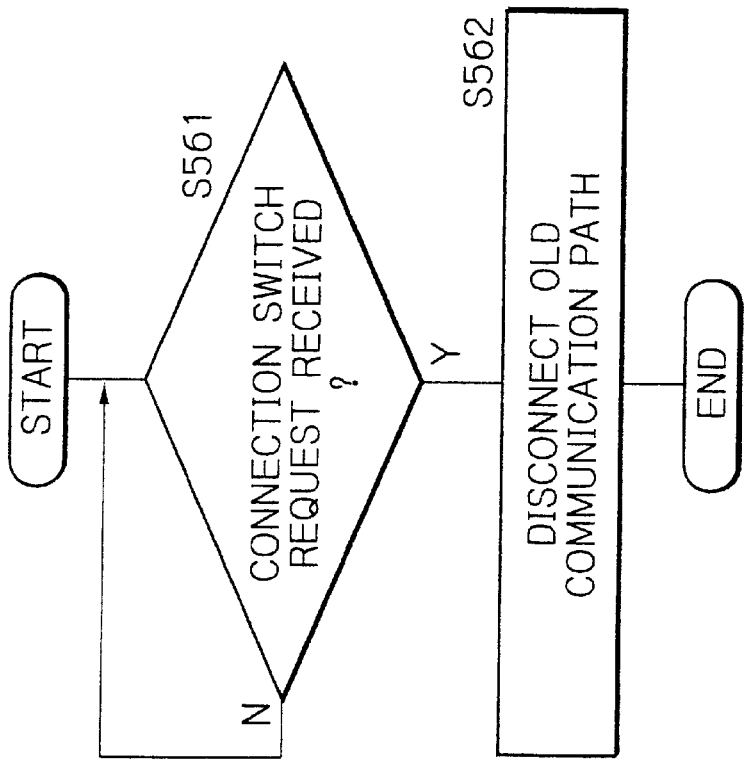
FIG. 14 is a flowchart showing a control procedure to be executed by the call controller of the first exchange in response to a connection switch request.

As shown in FIG. 14, on receiving the connection switch request from the second exchange $231_2$ (Y, step S561), the call controller $261_1$ of the first exchange $231_1$ disconnects the current communication path (step S562). More specifically, the call controller $261_1$ causes the connection controller $262_1$ to disconnect the extension telephone 281 and base station 251 from each other and connect the extension telephone 281 and trunk 241.

Referring again to FIG. 13, after the step S542, the call controller $261_2$ of the second exchange $231_2$ connects the new communication path (step S543). More specifically, after the connection controller $262_1$ of the first exchange $231_1$ has disconnected the extension telephone 281 and base station 251 and connected the telephone 281 and trunk 241, the connection controller $262_2$ of the second exchange $231_2$ connects the base station 252 and trunk 241. As a result, the mobile terminal 211 is handed over from the first exchange $231_1$ to the second exchange $231_2$ without conversation being interrupted. In this manner, the visitor terminal 211 entered the first network 201 from the foreign network 202 is successfully handed over from one exchange to another exchange within the network 201.

Assume that the conversation on the mobile terminal 211 ends while the mobile terminal 211 lies in the second area $221_2$ (Y, step S544). Then, the call controller $261_2$ of the second exchange $231_2$ reads the VLR manager node number of the third exchange $231_3$ out of the VLR manager node number storage $265_2$ (step S545). The call controller $261_2$ then sends a VLR holding node number delete request to the call controller $261_3$ of the third exchange $231_3$ by using the terminal number of the mobile terminal 211 as a key (step S546). Also, the call controller $261_2$ causes the connection controller $262_2$ to disconnect the base station 252 and trunk 241 (step S547). Further, the call controller $261_2$ sends a disconnect request to the call controller $261_1$ of the first exchange $231_1$ (step S548). In response, the call controller $261_1$ causes the connection controller $261_1$ to disconnect the extension telephone 281 and trunk 241 (step S549). Consequently, the mobile terminal 211 and extension telephone 281 are disconnected from each other.

Figure 15:
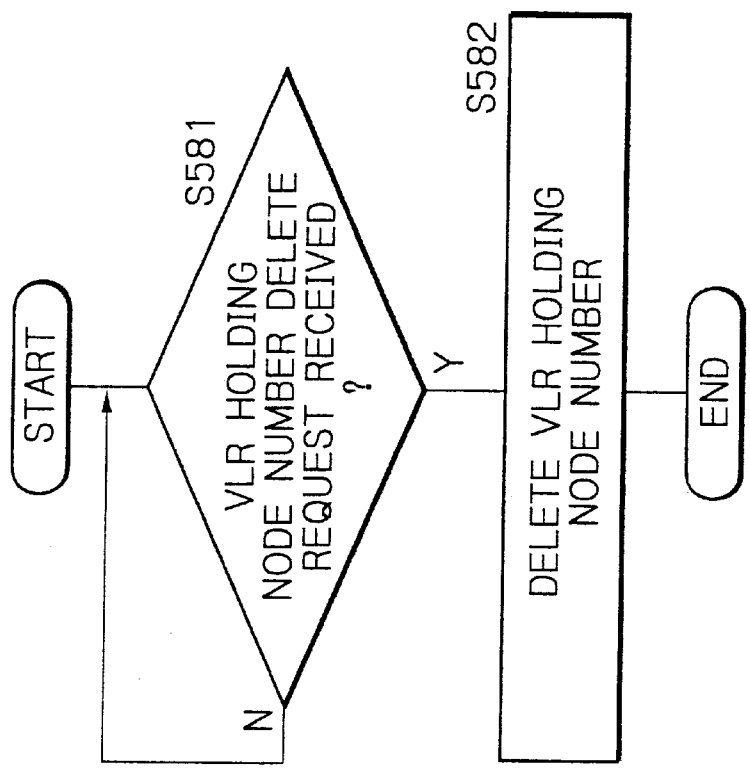
FIG. 15 is a flowchart showing a control procedure to be executed by the third exchange in response to a VLR holding node number delete request.

FIG. 15 shows a procedure that the third exchange $231_3$ executes in response to the VLR holding node delete request sent from the second exchange $231_2$. As shown, on receiving the VLR holding node delete request (Y, step S581), the call controller $261_3$ of the exchange $231_3$ deletes the terminal number of the mobile terminal 211 and the node number of the first exchange $231_1$ stored in the step S422 of FIG. 7 (step S582).

The illustrative embodiment will be described more specifically hereinafter. Assume that node numbers $NODE_1$ through $NODE_3$ are respectively assigned to the first to third exchanges $231_1$ through $231_3$ shown in FIG. 5 and that the third exchange $231_3$ is the VLR manager node. Also, assume that the terminal number of the mobile terminal 211 moving from the network 202 to the network 201 is "2000".

Assume that the mobile terminal 211 registered at the second network 202 has entered the area of the radio base station 251. Then, the mobile terminal 211 sends a registration signal to the first exchange $231_1$ via the base station 251. The registration signal includes a number showing that the home station to which the mobile terminal 211 belongs is the second network 202. The exchange $231_1$ belongs to the first network 201 different from the second network 202. The exchange $231_1$ therefore sends a roaming start request signal to the network 202, so that conversation can be held on the mobile terminal 211 in a service area belonging to another communication company. In response, the second network 202 sends authentication information necessary for conversation to be held on the mobile terminal 211 in the first network 201 to the first exchange $231_1$. The interchange of such signals is effected via the trunk. The first exchange $231_1$ writes the received authentication information in the VLR storage $264_1$. At this instant, the terminal number "2000" is used as a key for identifying the mobile terminal 211.

Figure 16B:
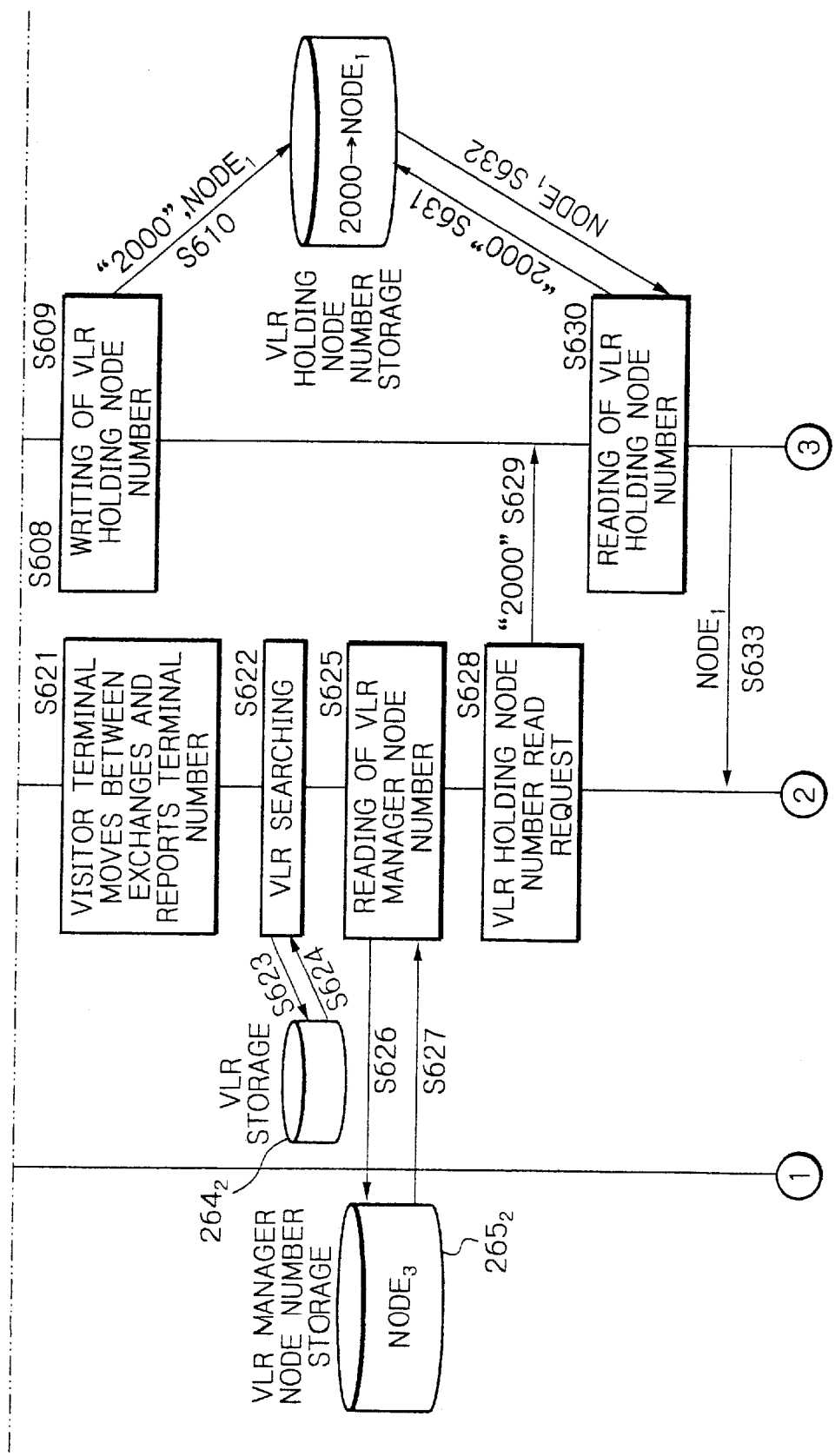
FIG. 16 is a sequential chart showing the former half of processing to be executed by the individual exchange when the visitor terminal enters a first network and starts communication.
Figure 17B:
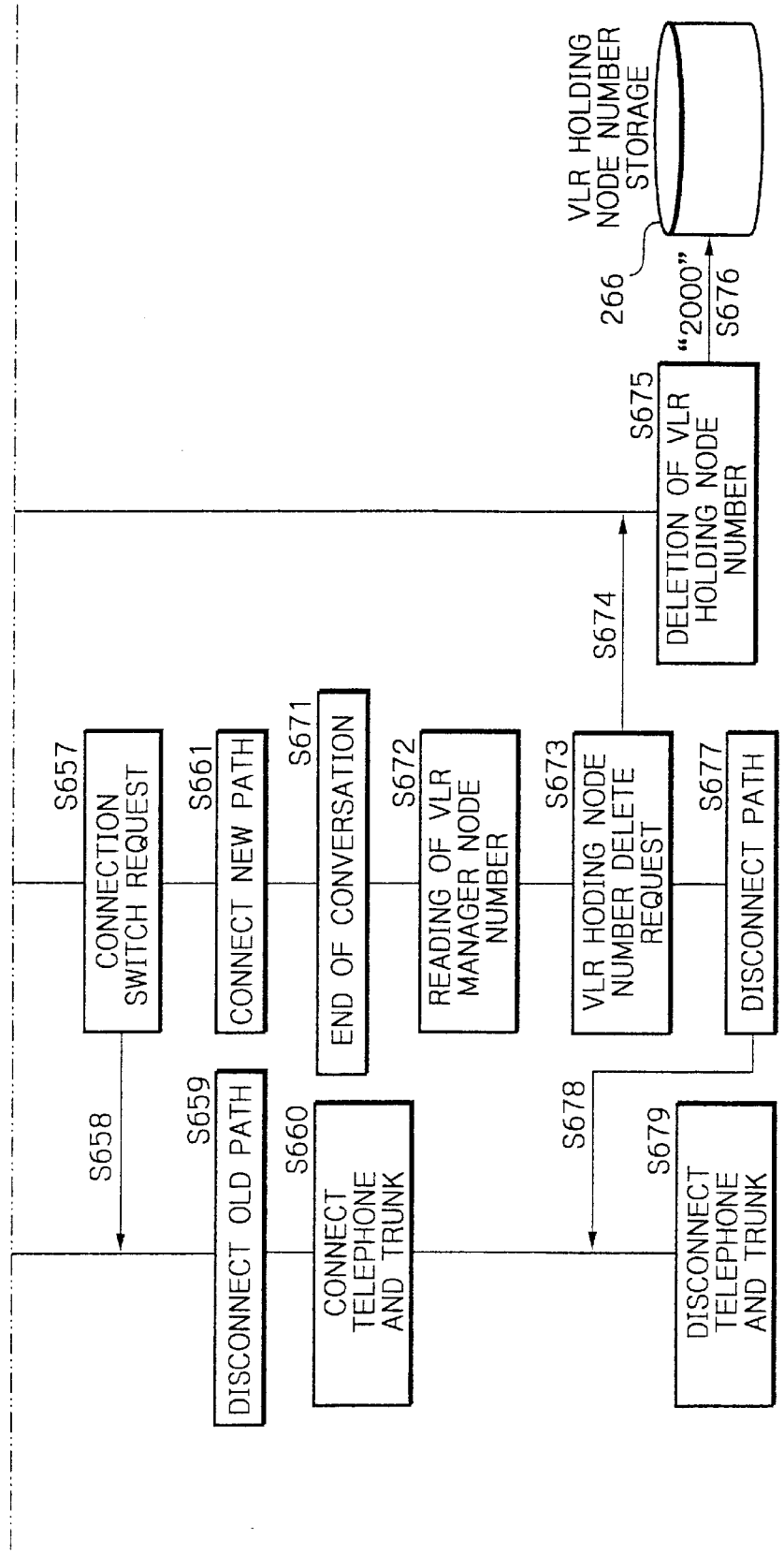
FIG. 17 is a sequential chart showing the latter half of the same processing.

FIGS. 16 and 17 are sequential charts demonstrating a sequence in which the first to third exchanges $231_1$ through $231_3$ operate after the entry of the mobile terminal 211 in the first network 201. In FIGS. 16 and 17, procedures executed by the exchanges $231_1$ through $231_3$ are shown in the direction of ordinate while the procedures executed between the exchanges $231_1$ through $231_3$ are shown in the direction of abscissa by horizontal and oblique lines.

Assume that the mobile terminal 211 starts communicating with the extension telephone 281 via the radio base station 251 connected to the first exchange $231_1$ (step S601, FIG. 16 and step S401, FIG. 6). The call controller $261_1$ of the first exchange $231_1$ writes the location of the base station 251 and that of the extension telephone 281 in the call information storage $263_1$ by using the terminal number "2000" of the mobile terminal 211 as a key (step S602, FIG. 16 and step S402, FIG. 6).

Subsequently, the call controller $261_1$ reads information out of the VLR manager node number storage $265_1$ (steps S604, S605 and S606, FIG. 16 and step S403, FIG. 6). Specifically, the VLR manager node number storage $265_1$ stores the node number of a single exchange that includes the VLR holding node number storage 266 in the network 201. In the illustrative embodiment, the node number $NODE_3$ assigned to the third exchange $231_3$ is stored in the VLR manager node number storage $265_1$ via a maintenance terminal or similar inputting means not shown. In this case, the call controller $265_1$ sees that the third exchange $231_3$ includes the VLR holding node number storage 266.

The call controller $261_1$ generates a VLR holding node number write request including the terminal number "2000" of the mobile terminal 211 and the node number $NODE_1$ assigned to the exchange $231_1$. The call controller $261_1$ then sends the VLR holding node number write request to the call controller $261_3$ of the third exchange $231_3$ (steps S607 and S608, FIG. 16 and step S404, FIG. 6). The call controller $261_3$ writes the node number $NODE_1$ received from the first exchange $231_1$ in its VLR holding node number storage 266 by using the terminal number "2000" as a key (steps S609 and S610, FIG. 16 and step S422, FIG. 7).

Assume that the mobile terminal 211, started communicating with the extension telephone 281 in the first area $221_1$, moves to the second area $221_2$ covered by the radio base station 252 in a direction indicated by an arrow 272. Then, the mobile terminal informs the call controller $261_2$ of the second exchange $231_2$ of its terminal number "2000" (step S621, FIG. 16 and step S441, FIG. 8). The call controller $261_2$ searches the VLR storage $264_2$ by using the terminal number "2000" as a key (steps S622 and S623, FIG. 16 and step S444, FIG. 8). At this time, the terminal number "2000" is absent in the VLR storage $264_2$ because the mobile station 211 has entered the area $221_2$ for the first time (step S624, FIG. 16 and N, step S445, FIG. 8). The call controller $261_2$ therefore reads the VLR manager node number out of the VLR manager node storage $265_2$ (steps S625, S626 and S627, FIG. 16 and step S446, FIG. 8).

Figure 8:
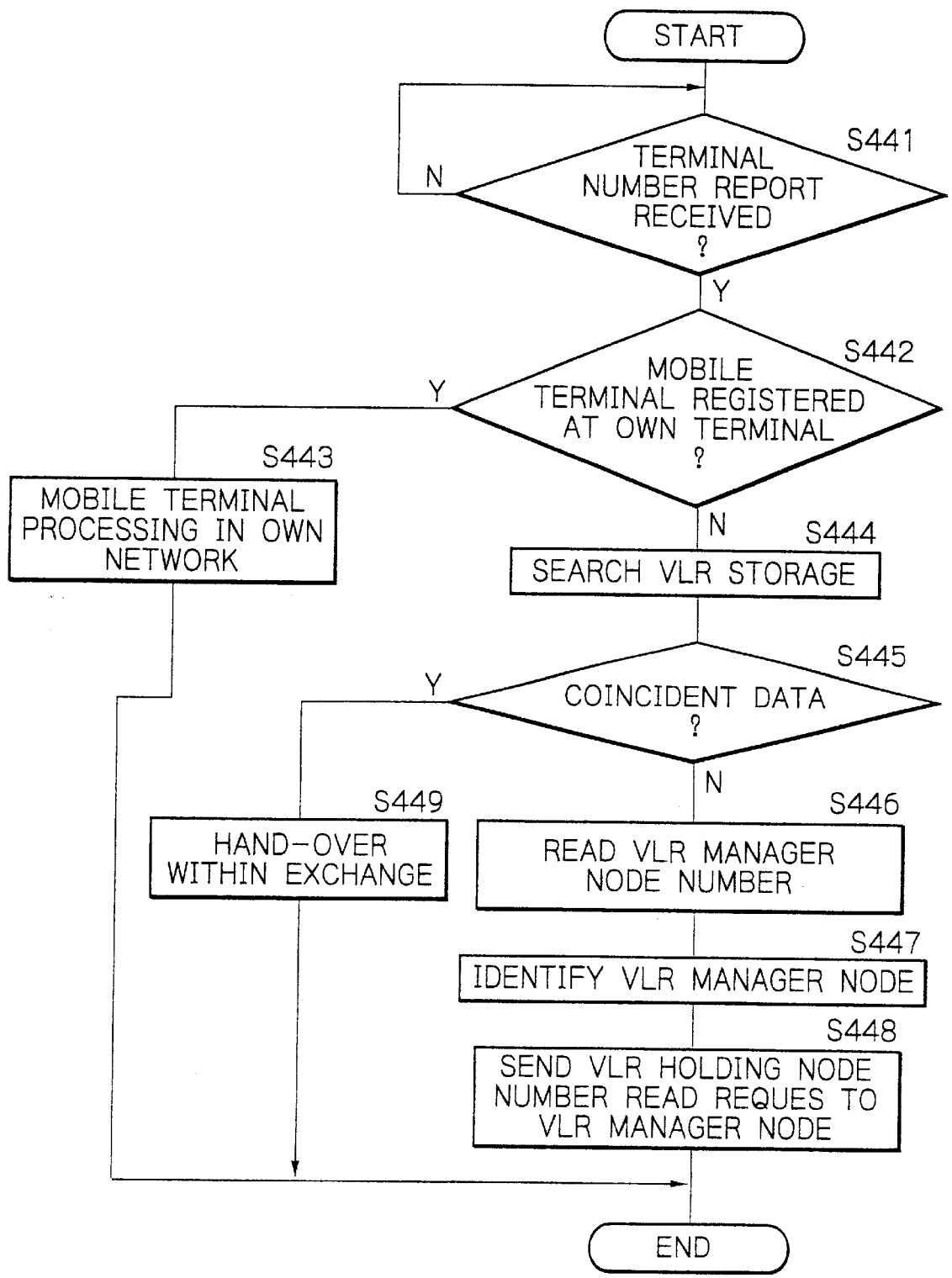
FIG. 8 is a flowchart showing a control procedure to be executed by a second exchange included in the illustrative embodiment when the visitor terminal enters an area assigned thereto.

The node number $NODE_3$ read out of the storage $265_2$ shows the call controller $261_2$ that the third exchange $231_3$ is the VLR manager node storing the VLR holding node number (step S447, FIG. 8). The call controller $261_2$ therefore sends to the third exchange $231_3$ a VLR holding node number read request corresponding to the terminal number "2000" (steps S628 and S629, FIG. 16 and step S448, FIG. 8).

On receiving the VLR holding node number request (Y, step S461, FIG. 9), the third exchange $231_3$ reads the VLR holding node number out of the VLR holding node number storage 266 by using the terminal number "2000" as a key (steps S630, S631 and S632, FIG. 16 and step S462, FIG. 9). The third exchange $231_3$ then sends the node number $NODE_1$ read out of the storage 266 to the second exchange $231_2$ (step S633, FIG. 16 and step S463, FIG. 9).

On receiving the node number $NODE_1$ as a VLR holding node number (step S633, FIG. 16 and Y, step S481, FIG. 10), the call controller $261_2$Of the second exchange $231_2$ sends to the call controller $261_1$ of the first exchange $231_1$ an authentication information read request including the terminal number "2000" (steps S641 and S642, FIG. 17 and step S482, FIG. 10).

On receiving the authentication information read request (step S642, FIG. 17 and Y, step S501, FIG. 11), the call controller $261_1$ of the first exchange $231_1$ searches the VLR storage $264_1$ by using the terminal number "2000" as a key (steps S643 and S644, FIG. 17). The call controller $261_1$ then reads out the authentication information corresponding to the terminal number "2000" (step S645, FIG. 17) and sends it to the second exchange $231_2$ (step S646, FIG. 17 and step S502, FIG. 11).

On receiving the authentication information from the first exchange $231_1$ (step S646, FIG. 17 and Y, step S483, FIG. 10), the call controller $261_2$ of the second exchange $231_2$ determines whether or not the mobile terminal 211 is authenticatable (step S647, FIG. 17 and step S484, FIG. 10). If the mobile terminal 211 is authenticatable (step S648, FIG. 17 and step S485, FIG. 10), then the call controller $261_2$ sends to the first exchange $231_1$ a call information read request including the location of the base station 251 to which the mobile terminal 211 has been connected and the location of the extension telephone 281 (steps S651 and S652, FIG. 17 and step S486, FIG. 10).

On receiving the call information read request (step S652, FIG. 17 and Y, step S521, FIG. 12), the call controller $261_1$ of the first exchange $231_1$ searches the call information storage $263_1$ by using the terminal number "2000" as a key (steps S653 and S654, FIG. 17). By the search, the call controller $261_1$ reads out the call information representative of the location of the base station 251 and that of the extension telephone 281 out of the call information storage $263_1$ (step S655, FIG. 17 and step S522, FIG. 12). The call controller $261_1$ then sends the call information to the second exchange $231_2$ (step S656, FIG. 17 and step S523, FIG. 12).

On receiving the call information (step S656, FIG. 17 and Y, step S541, FIG. 13), the call controller $261_2$ of the second exchange $231_2$ sends a connection switch request for switching the exchange to the call controller $261_1$ of the first exchange $231_1$ (steps S657 and S658, FIG. 17 and step S542, FIG. 13).

On receiving the connection switch request (step S658, FIG. 17 and Y, step S561, FIG. 14), the call controller $261_1$ of the first exchange $231_1$ disconnects the existing communication path (step S659, FIG. 17 and step S562, FIG. 14). More specifically, the call controller $261_1$ causes the connection controller $262_1$ to disconnect the extension telephone 281 and base station 251 and connect the telephone 281 and trunk 241 (step S660, FIG. 17).

After sending the connection switch request to the first exchange $231_1$, the call controller $261_2$ of the second exchange $231_2$ connects a new communication path (step S661, FIG. 17 and step S543, FIG. 13). More specifically, after the connection control $262_1$ has disconnected the extension telephone 281 and base station 251 and connected the telephone 281 and trunk 241, the call controller $261_2$ causes the connection controller $262_2$ to connect the base station 252 and trunk 241. This allows the mobile terminal 211 to communicate with the second exchange $231_2$ instead of with the first exchange $231_1$ without any interruption.

Assume that conversation on the mobile terminal 211 ends while the mobile terminal 211 lies in the second area $221_2$ (step S671, FIG. 17 and Y, step S544, FIG. 13). Then, the call controller $261_2$ of the second exchange $231_2$ reads the VLR manager node number $NODE_3$ assigned to the third exchange $231_3$ out of the VLR manager node number storage $265_2$ (step S672, FIG. 17 and step S545, FIG. 13). The call controller $261_2$ then sends to the call controller $261_3$ of the third exchange $231_3$ a VLR holding node number delete request by using the terminal number "2000" as a key (steps S673 and S674, FIG. 17 and step S546, FIG. 13).

On receiving the VLR holding node number delete request (step S674, FIG. 17 and Y, step S581, FIG. 15), the call controller 261₃ of the third exchange 231₃ deletes the terminal number "2000" and the node number NODE₁ written in the step S422 of FIG. 7 in the VLR holding node number storage 266 (steps S675 and S676, FIG. 17 and step S582, FIG. 15). Also, the call controller 261₂ causes the connection controller 262₂ to disconnect the base station 252 and trunk 241 (step S677, FIG. 17 and step S547, FIG. 13). Further, the call controller 261₂ sends a disconnect request to the call controller 261₁ of the first exchange 231₁ (step S678, FIG. 17 and step S547, FIG. 13). In response to the disconnect signal, the call controller 261₁ causes the connection controller 262₁ to disconnect the extension telephone 281 and trunk 241 (step S679, FIG. 17 and step S549, FIG. 13). As a result, the mobile terminal 221 and extension telephone 281 are disconnected from each other. In this manner, the visitor terminal 211 entered the first network 201 from the foreign network 202 is successfully handed over from one exchange to another exchange within the network 201.

In the illustrative embodiment shown and described, the third exchange 231₃ serves as a VLR manager node including the VLR holding node number storage 266 that sores a VLR holding node number. This can be easily done so long as the number of exchanges constituting a one-system look is small. Assume that the number of exchanges belonging to the one-system look increases or that a great number of mobile terminals registered at a foreign network are expected to arrive at the network including the VLR manager node, increasing the amount of nodes to be stored in the storage 266. Then, a plurality of storages 266 may be distributed in the one-system look. Further, the storage 266 may be stored in the preselected area of a computer or a server other than exchanges.

By locating the VLR holding node number storage 266 outside of the exchange 231₃, it is possible to release the exchange 231₃ from the storage 266. The exchange 231₃ is therefore free from extra loads ascribable to the writing and reading of data in the VLR holding node, the deletion of data and so forth.

In the illustrative embodiment, as soon as conversation on the mobile terminal 211 ends, the terminal number of the mobile terminal 211 and the node number of the exchange 231₁ stored in the VLR holding node number storage 266 are deleted. Alternatively, the node number may not be deleted until a preselected period of time expires. In such a case, the amount of data representative of VLR holding node numbers to be stored in the storage 266 increases. However, when, e.g., a call is again originated on the mobile terminal 211 in the same network, the authentication information of the terminal 211 stored in the VLR storage 264 can be again used.

In summary, it will be seen that the present invention provides a mobile communication system and a mobile communication method having various unprecedented advantages, as enumerated below.

(1) A mobile terminal, which is a visitor terminal, can be handed over between exchanges within a network at which the mobile station is not registered. Further, it is possible to store authentication information and call information in particular memories while determining the occupancy of the memories of the individual exchange belonging to the network. This prevents an exchange covering, e.g., the entrance of an office from storing an excessive amount of authentication information by pressing its memory.

(2) Authentication information is written to an exchange that has sent an authentication information request. This makes processing to follow easier than when the authentication information is written to another exchange.

(3) The mobile communication system can be constructed without resorting to any extra circuitry.

(4) Needless data are deleted when communication ends, saving the limited capacity of a memory.

(5) Data can be stored in, e.g., a personal computer or a server if available in the network. Therefore, the memory capacity of an existing exchange does not have to be increased.

(6) Information that are likely to become wasteful are not stored in a memory.

Various modifications will become possible for those skilled in the art after receiving the teachings of the present disclosure without departing from the scope thereof.

What is claimed is:

1. A mobile communication system comprising:
network identification information obtaining means belonging to a first network for obtaining, when a mobile terminal not registered at said first network enters said first network as a visitor terminal, identification information that identifies a second network at which said mobile terminal is registered;
authentication information requesting means for requesting, based on said identification information obtained, the second network to send authentication information necessary for the visitor terminal to communicate in the first network;
authentication information storing means for storing, when the authentication information is received from the second network, said authentication information in any one of a plurality of exchanges belonging to the first network;
call information storing means for storing call information generated when the visitor terminal starts communication in the first network;
exchange storing means for storing information representative of the exchanges each storing the authentication information and call information of a particular visitor terminal; and
searching means for searching, when any one of the exchanges needs for hand-over the authentication information and call information of the visitor terminal that moves while in communication, contents of said exchange storing means to thereby locate the exchange storing said authentication information and said call information and provide said one exchange with said authentication information and said call information.

2. The system as claimed in claim 1, wherein said exchange storing means comprises means other than the exchanges belonging to the first network.

3. The system as claimed in claim 2, wherein the exchanges comprise private branch exchanges.

4. The system as claimed in claim 1, wherein when a call is originated on the visitor terminal, said exchange storing means stores the information representative of the exchange storing the authentication information in correspondence to said visitor terminal.

5. The system as claimed in claim 4, wherein the exchanges comprise private branch exchanges.

6. The system as claimed in claim 1, wherein the exchanges comprise private branch exchanges.

7. A mobile communication system comprising:
network identification information obtaining means belonging to a first network for obtaining, when a mobile terminal not registered at said first network enters said first network as a visitor terminal, identification information that identifies a second network at which said mobile terminal is registered;

authentication information requesting means for requesting, based on said identification information obtained, the second network to send authentication information necessary for the visitor terminal to communicate in said first network;

authentication information storing means for storing, when the authentication information is received from the second network, said authentication information in any one of a plurality of exchanges belonging to the first network;

call information storing means for storing call information generated when the visitor terminal starts communication in the first network;

first exchange storing means for storing data representative of the exchanges each storing the authentication information and call information of a particular visitor terminal;

second exchange storing means for storing the information representative of the exchange caused to store the authentication information by said authentication information storing means and the call information stored in said call information storing means in correspondence to the visitor terminal; and searching means for searching, when any one of the exchanges needs for hand-over the authentication information and call information of the visitor terminal, which moves in the first network while in communication in the first network, contents of said first exchange storing means to thereby locate the exchange storing said authentication information and said call information and provide said one exchange with said authentication information and said call information.

8. The system as claimed in claim 7, wherein said exchange storing means comprises means other than the exchanges belonging to the first network.

9. The system as claimed in claim 8, wherein the exchanges comprise private branch exchanges.

10. The system as claimed in claim 7, wherein when a call is originated on the visitor terminal, said exchange storing means stores the data representative of the exchange storing the authentication information in correspondence to said visitor terminal.

11. The system as claimed in claim 10, wherein the exchanges comprise private branch exchanges.

12. The system as claimed in claim 7, wherein the exchanges comprise private branch exchanges.

13. A mobile communication system comprising:

network identification information obtaining means belonging to a first network for obtaining, when a mobile terminal not registered at said first network enters said first network as a visitor terminal, identification information that identifies a second network at which said mobile terminal is registered;

authentication information requesting means for requesting, based on said identification information obtained, the second network to send authentication information necessary for the visitor terminal to communicate in the first network;

authentication information storing means for storing, when the authentication information is received from the second network, said authentication information in any one of a plurality of exchanges belonging to the first network;

call information storing means for storing call information generated when the visitor terminal starts communicating in the first network;

exchange storing means for storing data representative of the exchanges each storing the authentication information and call information of a particular visitor terminal; and searching means for searching, when any one of the exchanges needs for hand-over the authentication information and call information of the visitor terminal, which moves in the first network while in communication in the first network, contents of said exchange storing means of a particular one of the exchanges to thereby locate the exchange storing said authentication information and said call information and provide said one exchange with said authentication information and said call information.

14. The system as claimed in claim 13, wherein the particular exchange comprises exchange reporting means for storing the exchange, which stores the authentication information stored by said exchange storing means, in relation to the visitor terminal, and reporting said exchange storing said authentication information when the visitor terminal is identified.

15. The system as claimed in claim 14, wherein the exchanges comprise private branch exchanges.

16. The system as claimed in claim 13, further comprising information deleting means for deleting, when the visitor terminal ends communication in the first network, part of the information representative of the exchange storing the authentication information, which is stored by said exchange storing means, corresponding to said visitor terminal.

17. The system as claimed in claim 16, wherein the exchanges comprise private branch exchanges.

18. The system as claimed in claim 13, wherein when a call is originated on the visitor terminal, said exchange storing means stores the data representative of the exchange storing the authentication information in correspondence to said visitor terminal.

19. The system as claimed in claim 18, wherein the exchanges comprise private branch exchanges.

20. The system as claimed in claim 13, wherein the exchanges comprise private branch exchanges.

21. A mobile communication method comprising the steps of:

obtaining, when a mobile terminal not registered at a first network enters said first network as a visitor terminal, identification information that identifies a second network at which said mobile terminal is registered;

requesting, based on said identification information obtained, the second network to send authentication information necessary for the visitor terminal to communicate in said first network;

storing, when the authentication information is received from the second network, said authentication information in any one of a plurality of exchanges belonging to the first network;

storing call information generated when the visitor terminal starts communicating in the first network;

storing data representative of the exchanges each storing the authentication information and call information of a particular visitor terminal; and searching, when any one of the exchanges needs for hand-over the authentication information and call information of the visitor terminal that moves while in communication, contents of said exchange storing means to thereby locate the exchange storing said authentication information and said call information and providing said one exchange with said authentication information and said call information.

22. A mobile communication system comprising the steps of:

obtaining, when a mobile terminal not registered at a first network enters said first network as a visitor terminal, identification information that identifies a second network at which said mobile terminal is registered;

requesting, based on said identification information obtained, the second network to send authentication information necessary for the visitor terminal to communicate in said first network;

storing, when the authentication information is received from the second network, said authentication information in any one of a plurality of exchanges belonging to the first network;

storing call information generated when the visitor terminal starts communicating in the first network;

storing data representative of the exchanges each storing the authentication information and call information of a particular visitor terminal; and searching, when any one of the exchanges needs for hand-over the authentication information and call information of the visitor terminal that moves while in communication, contents of said exchange storing means to thereby locate the exchange storing said authentication information and said call information and providing said one exchange with said authentication information and said call information.

23. A mobile communication system comprising the steps of:

obtaining, when a mobile terminal not registered at a first network enters said first network as a visitor terminal, identification information that identifies a second network at which said mobile terminal is registered;

requesting, based on said identification information obtained, the second network to send authentication information necessary for the visitor terminal to communicate in the first network;

storing, when the authentication information is received from the second network, said authentication information in any one of a plurality of exchanges belonging to the first network;

storing call information generated when the visitor terminal starts communicating in the first network;

storing data representative of the exchanges each storing the authentication information and call information of a particular visitor terminal; and searching, when any one of the exchanges needs for hand-over the authentication information and call information of the visitor terminal, which moves in the first network while in communication in the first network, contents of said exchange storing means of a particular one of the exchanges to thereby locate the exchange storing said authentication information and said call information and providing said one exchange with said authentication information and said call information.

* * * * *